US009615596B2

(12) United States Patent
Dierbach et al.

(10) Patent No.: US 9,615,596 B2
(45) Date of Patent: Apr. 11, 2017

(54) PROTEIN PRODUCTS AND METHODS FOR MAKING THE SAME

(71) Applicant: Kraft Foods Group Brands LLC, Chicago, IL (US)

(72) Inventors: Lisa A. Dierbach, Arlington Heights, IL (US); Julia L. Gregg-Albers, Glenview, IL (US); Ryan M. High, Evanston, IL (US); Jennifer L. Kimmel, Evanston, IL (US); Ray Laudano, Libertyville, IL (US); Inmaculada Andujar Ortiz, Arlington Heights, IL (US); Yan Wang, Northfield, IL (US)

(73) Assignee: Kraft Foods Group Brands LLC, Chicago, IL (US)

( * ) Notice: Subject to any disclaimer, the term of this patent is extended or adjusted under 35 U.S.C. 154(b) by 0 days.

(21) Appl. No.: 15/069,218

(22) Filed: Mar. 14, 2016

(65) Prior Publication Data

US 2016/0192671 A1 Jul. 7, 2016

(51) Int. Cl.
*A23C 11/10* (2006.01)
*A23J 3/14* (2006.01)
(Continued)

(52) U.S. Cl.
CPC ............... *A23C 11/103* (2013.01); *A23J 1/14* (2013.01); *A23J 3/14* (2013.01); *A23L 25/00* (2016.08)

(58) Field of Classification Search
CPC ................................ A23C 11/103; A23J 3/14
See application file for complete search history.

(56) References Cited

U.S. PATENT DOCUMENTS 3,457,087 A 7/1969 Renner
3,639,129 A 2/1972 Mustakas et al.
(Continued)

FOREIGN PATENT DOCUMENTS

CN 85105116 A 12/1986
CN 85101742 A 1/1987
(Continued)

OTHER PUBLICATIONS

Adesola et al., "Effects of some processing factors on the characteristics of stored groundnut milk extract"—African Journal of Food Science, vol. 7(6), Jun. 2013, pp. 134-142.*
(Continued)

*Primary Examiner* — Elizabeth Gwartney
(74) *Attorney, Agent, or Firm* — Dinsmore & Shohl LLP

(57) ABSTRACT

According to one embodiment, a protein product may include a mixture of water and particulate matter comprising protein. The mixture may include medium chain aldehydes and pyrazines. The ratio of a total concentration of medium chain aldehydes in the mixture to a total concentration of pyrazines in the mixture, as determined by gas chromatography-mass spectrometry, may be greater than or equal to 0.5 and less than or equal to 45. The mixture may also include from about 0.5 wt. % to about 8.0 wt. % total protein by weight of the mixture. In addition, the mixture may include from about 40 wt. % to about 98 wt. % water by weight of the mixture and less than or equal to about 4.0 wt. % oil and fat by weight of the mixture. The particulate matter may have an average particle size less than or equal to about 50 μm.

29 Claims, 7 Drawing Sheets

(51) Int. Cl.
*A23J 1/14* (2006.01)
*A23L 25/00* (2016.01)

(56) References Cited

U.S. PATENT DOCUMENTS 3,689,287 A 9/1972 Mitchell, Jr.
3,800,056 A 3/1974 Mitchell, Jr.
3,947,599 A 3/1976 Mitchell, Jr.
4,025,658 A 5/1977 Pominski et al.
4,052,516 A 10/1977 Mitchell
4,113,889 A 9/1978 Baxley
4,177,296 A 12/1979 Mochizuki et al.
4,364,967 A 12/1982 Black
4,376,133 A 3/1983 Farnand
4,418,084 A 11/1983 Murray et al.
4,650,857 A 3/1987 May
4,659,583 A 4/1987 Hashimoto et al.
4,667,015 A 5/1987 May
4,705,691 A 11/1987 Kupper
4,728,526 A 3/1988 Avera
4,746,530 A 5/1988 Abdul
4,832,977 A 5/1989 Avera
4,942,055 A 7/1990 Avera
4,980,193 A 12/1990 Tuason, Jr. et al.
5,429,836 A 7/1995 Fuisz
5,656,321 A 8/1997 Berger et al.
6,123,976 A 9/2000 Stoddard
6,153,247 A 11/2000 Stoddard
6,156,372 A 12/2000 Yameogo
6,716,471 B2 4/2004 Kramer
6,821,543 B1 11/2004 Paquet et al.
6,986,912 B2 1/2006 Kramer
7,678,403 B2 3/2010 Mitchell et al.
8,007,851 B2 8/2011 Rosevear
8,101,218 B2 1/2012 Minus
8,586,113 B2 11/2013 Carder et al.
8,597,712 B2 12/2013 Hayes et al.
2005/0233051 A1 10/2005 Shen
2006/0083824 A1 4/2006 Manning et al.
2006/0198911 A1 9/2006 Chen
2008/0181999 A1 7/2008 Yang
2010/0068334 A1 3/2010 Race
2011/0143010 A1 6/2011 Gerrits et al.
2014/0234488 A1 8/2014 Chang
2014/0370180 A1 12/2014 Tan et al.

FOREIGN PATENT DOCUMENTS

CN 86104743 A 1/1988
CN 1210692 A 3/1993
CN 1091612 A 9/1994
CN 1167585 A 12/1997
CN 1565261 A 1/2005
CN 1788624 A 6/2006
CN 1849941 A 10/2006
CN 1923058 A 3/2007
CN 101019673 A 8/2007
CN 101095475 A 1/2008
CN 101103790 A 1/2008
CN 101461552 A 6/2009
CN 101467563 A 7/2009
CN 101491363 A 7/2009
CN 101502289 A 8/2009
CN 101513266 A 8/2009
CN 101513268 A 8/2009
CN 101695320 A 4/2010
CN 101695348 A 4/2010
CN 101731680 A 6/2010
CN 101731682 A 6/2010
CN 101731703 A 6/2010
CN 101755908 A 6/2010
CN 101755916 A 6/2010
CN 101243893 B 12/2010
CN 101926389 A 12/2010
CN 102018256 A 4/2011
CN 102047965 A 5/2011
CN 102047974 A 5/2011
CN 102090456 A 6/2011
CN 102099450 A 6/2011
CN 102106397 A 6/2011
CN 102106399 A 6/2011
CN 101390582 B 7/2011
CN 101584365 B 7/2011
CN 102113569 A 7/2011
CN 201919598 U 8/2011
CN 101715825 B 12/2011
CN 102318682 A 1/2012
CN 102326627 A 1/2012
CN 102370007 A 3/2012
CN 101695347 B 4/2012
CN 102405980 A 4/2012
CN 102461672 A 5/2012
CN 101766314 B 6/2012
CN 101485478 B 7/2012
CN 102524859 A 7/2012
CN 102550676 A 7/2012
CN 102119738 B 10/2012
CN 102119740 B 10/2012
CN 102771562 A 11/2012
CN 101653278 B 2/2013
CN 102960455 A 3/2013
CN 103005254 A 4/2013
CN 103098893 A 5/2013
CN 103202509 A 7/2013
CN 103461504 A 12/2013
CN 102871185 B 2/2014
CN 103549020 A 2/2014
CN 103583763 A 2/2014
CN 103636804 A 3/2014
CN 103749712 A 4/2014
CN 103750457 A 4/2014
CN 103766496 A 5/2014
CN 103783167 A 5/2014
CN 103859129 A 6/2014
CN 103891891 A 7/2014
CN 103891903 A 7/2014
CN 103999943 A 8/2014
CN 104026245 A 9/2014
CN 104068124 A 10/2014
CN 104186662 A 12/2014
CN 104250307 A 12/2014
CN 103053696 B 1/2015
CN 104255913 A 1/2015
CN 104273602 A 1/2015
CN 104304464 A 1/2015
CN 104304476 A 1/2015
CN 104322702 A 2/2015
CN 104365858 A 2/2015
CN 104397195 A 3/2015
CN 104413153 A 3/2015
CN 104430600 A 3/2015
CN 104430900 A 3/2015
CN 104489103 A 4/2015
CN 104489116 A 4/2015
CN 103907681 B 5/2015
CN 104642553 A 5/2015
CN 104719489 A 6/2015
CN 104738180 A 7/2015
CN 104738184 A 7/2015
CN 104738190 A 7/2015
CN 104738779 A 7/2015
CN 104745425 A 7/2015
CN 104757118 A 7/2015
CN 104782769 A 7/2015
CN 104782773 A 7/2015
CN 104783266 A 7/2015
CN 104783277 A 7/2015
CN 104798898 A 7/2015
CN 104799281 A 7/2015
CN 104799372 A 7/2015
CN 102379444 B 9/2015
CN 103734319 B 9/2015
CN 103462154 B 1/2016
EP 0035676 A1 9/1981

(56) References Cited

FOREIGN PATENT DOCUMENTS

| | | | |
|---|---|---|---|
| GB | 1200419 | A | 7/1970 |
| GB | 2151449 | A | 7/1985 |
| JP | H0484861 | A | 3/1992 |
| JP | 2011019437 | A | 2/2011 |
| KR | 20010045834 | A | 6/2001 |
| WO | 2012076565 | A1 | 6/2012 |

OTHER PUBLICATIONS

Slocum, Megan, "Soaked and Roasted Peanuts and Peanut Butter", Jan. 30, 2012, [retrieved on Jul. 7, 2015], URL: http://wholenatural-life.com/2012/01/30/soaked-and-roasted-peanuts-and-peanut-butter/>.

McDaniel, Kristin Alicia, "Effects of different time/ temperature roast combinations on peanut flavor, mechanical and nutritional properties.", (2011), <URL: http://repository.lib.ncsu.edu/ir/bitstream/1840.16/7324/1/etd.pdf> pp. 1-101.

* cited by examiner

PROTEIN PRODUCTS AND METHODS FOR MAKING THE SAME

BACKGROUND

Field

The present specification generally relates to protein products and, more specifically, to beverage products containing protein from a plant-based protein source and methods for making the same.

Technical Background

A common and relatively inexpensive source of protein is dairy products, specifically dairy milk. However, there is a concern over the exposure of milk cows to antibiotics, hormones, and genetically modified substances (i.e., plant material used as livestock feed) and the possibility that such substances may be passed to the consumer through dairy milk. In addition, some consumers are lactose intolerant making dairy milk difficult to consume while still others find the caloric content and/or cholesterol content of dairy milk to be relatively high, particularly those consumers on restricted diets. As such, there is growing demand for a healthy, good tasting source of protein that may be used as a replacement for dairy milk.

Several alternatives to dairy milk are available on the market today. These alternatives include, for example, almond milk, cashew milk, and soy milk. While popular amongst consumers, each of these products has drawbacks. For example, milk substitutes derived from almonds and cashews have a low protein content relative to dairy milk. The dairy milk industry has keyed on this property and current ad copy touts the relatively high protein content in dairy milk versus the low protein content in milk substitutes derived from almonds and/or cashews. Further, milk substitutes derived from soy may contain phytoestrogens and protease inhibitors from soy, which some consumers find undesirable. Moreover, soy plants from which the soy milk is derived are a genetically modified organism (GMO) which some consumers may also find undesirable.

Accordingly, a need exists for an alternative substitute for dairy milk which is plant-based, cholesterol-free, lactose free, and relatively low calorie, but which also has high protein content.

SUMMARY

According to one embodiment, a protein product may include a mixture of water and particulate matter comprising protein. The mixture may include medium chain aldehydes and pyrazines. The ratio of a total concentration of medium chain aldehydes in the mixture to a total concentration of pyrazines in the mixture, as determined by gas chromatography-mass spectrometry, may be greater than or equal to 0.5 and less than or equal to 45. The mixture may also include from about 0.5 wt. % to about 8.0 wt. % total protein by weight of the mixture. In addition, the mixture may include from about 40 wt. % to about 98 wt. % water by weight of the mixture and less than or equal to about 4.0 wt. % oil and fat by weight of the mixture. The particulate matter may have an average particle size less than or equal to about 50 μm.

In another embodiment, a protein product may include a mixture of water and particulate matter comprising protein aggregates derived from peanuts. The protein aggregates may have an average aggregate size of greater than or equal to 4 microns. The mixture may also include from about 0.5 wt. % to about 8.0 wt. % total protein by weight of the mixture, from about 40 wt. % to about 98 wt. % water by weight of the mixture; and less than or equal to about 4.0 wt. % oil and fat by weight of the mixture.

In another embodiment, a method of making a protein product may include processing nuts with a heat load greater than or equal to 3, wherein the nuts are at least one of tree nuts and peanuts. The nuts may be ground thereby forming a protein paste. The protein paste may be blended with water thereby forming a mixture having a total protein content from about 0.5 wt. % to about 8.0 wt. % by weight of the mixture. The oil and fat content of the mixture may be reduced to less than or equal to about 4.0 wt. % by weight of the mixture. Thereafter, the mixture may be sterilized with an indirect sterilization process whereby, after sterilization, the mixture comprises protein aggregates having an average aggregate size greater than or equal to 4 microns.

Additional features and advantages of the protein products described herein and methods for making the same will be set forth in the detailed description which follows, and will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
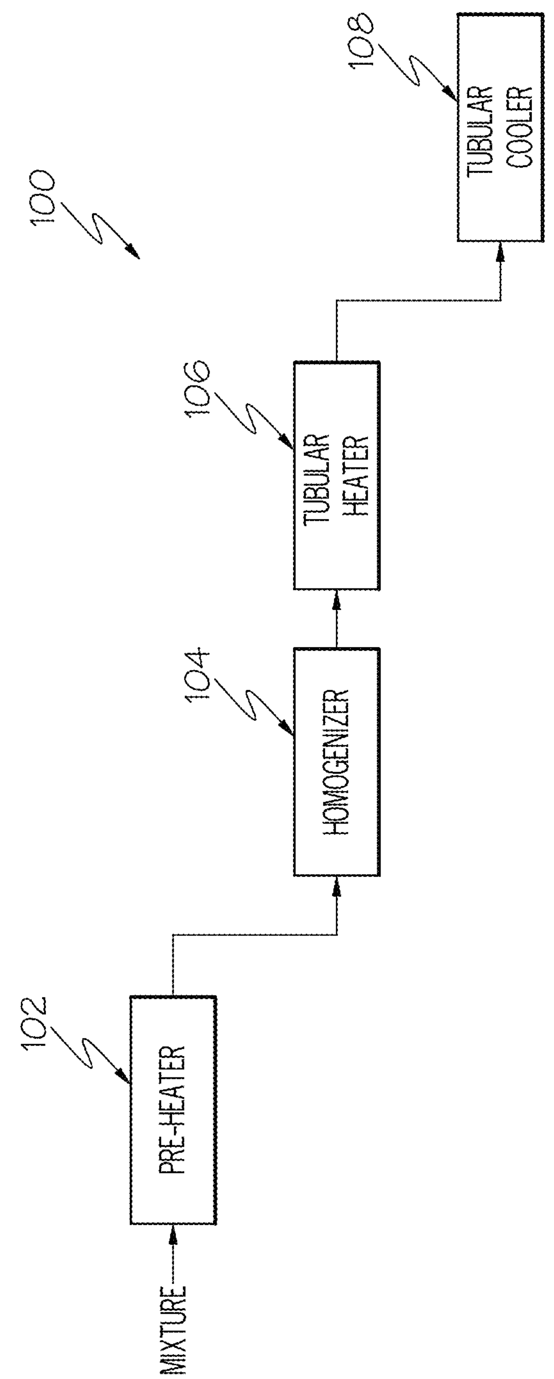
FIG. 1 schematically depicts an indirect sterilization process according to one or more embodiments shown and described herein.

Reference will now be made in detail to various embodiments of protein products, such as beverages, and methods for making the same. Whenever possible, the same reference numerals will be used throughout the drawings to refer to the same or like parts. According to embodiments, a protein product, such as a beverage, may include a mixture of water and particulate matter comprising protein. The particulate matter may have an average particle size less than or equal to about 50 μm. The mixture may include medium chain aldehydes and pyrazines. A ratio of a total concentration of medium chain aldehydes in the mixture to a total concentration of pyrazines in the mixture, as determined by gas chromatography-mass spectrometry, may be greater than or equal to 1 and less than or equal to 30. The mixture may further include from about 0.5 wt. % to about 8.0 wt. % total protein by weight of the mixture and from about 70 wt. % to about 98 wt. % water by weight of the mixture. The mixture may further include less than or equal to about 4.0 wt. % oil and fat by weight of the mixture. Various embodiments of protein products and methods for making the same will be described in further detail herein with specific reference to the appended drawings.

It should be understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other.

Unless otherwise specified, a range of values, when recited, includes both the upper and lower limits of the range as well as any ranges therebetween. As used herein, the indefinite articles "a," "an," and the corresponding definite article "the" mean "at least one" or "one or more," unless otherwise specified. It also is understood that the various features disclosed in the specification and the drawings can be used in any and all combinations.

Tree nuts and legumes, such as peanuts and soy beans, contain protein and may be used as a basis for dairy milk substitutes. One drawback to using tree nuts and legumes as a basis for dairy milk substitutes is the presence of (or potential to develop) organic aroma compounds which, in turn, may impart an undesirable or "off" flavor in the resulting product at certain levels. Specifically, volatile organic aroma compounds, such as pyrazines and medium chain aldehydes, may be present in the raw tree nuts and legumes and/or may develop during processing of the tree nuts and legumes into a protein-containing product such as a dairy milk substitute. These organic aroma compounds may have a very low sensory detection threshold and, as a result, can strongly influence the flavor of the resulting product. For example, when raw or unprocessed, some tree nuts and legumes may contain medium chain aldehydes, such as hexanal or the like. These organic aroma compounds may impart a "grassy" or "beany" flavor to the protein product which may be unacceptable to the consumer at certain levels. Similarly, during processing, some tree nuts and legumes may develop one or more pyrazine compounds which impart a strong roasted flavor which may be similarly unacceptable to the consumer at certain levels. The methods for making protein products described herein provide a protein product, such as a dairy milk substitute, in which the development of "off" flavors due to organic aroma compounds is mitigated.

In the embodiments described herein, the protein products may be beverages for human consumption. The protein products may contain a mixture of water and particulate matter which includes, among other constituents, protein. The particulate matter is derived from a plant-based protein source such as, for example, tree nuts, legumes, grains, vegetable proteins, or combinations thereof (referred to hereinafter as "the protein source"). Suitable tree nuts may include, without limitation, cashews and almonds. Suitable legumes may include, without limitation, soy beans and peanuts. Suitable grains may include, without limitation, oats, wheat, and quinoa. Suitable vegetable proteins may include, without limitation, pea protein. In some embodiments, the protein products are made from peanuts and one or more tree nuts and/or soy beans. In other embodiments, the protein products are made from peanuts without the addition of tree nuts or other legumes. The relative concentrations of water and particulate matter may be adjusted to impart a desired consistency and/or viscosity to the protein product. For example, the concentration of water in the protein product may be decreased to provide a beverage with the consistency or viscosity of a "shake" or a "smoothie." Alternatively, the concentration of water in the protein product may be increased to provide a beverage with a consistency and/or viscosity similar to dairy milk.

In the embodiments described herein, the protein products may be made by first (and optionally) washing the raw protein source to remove any remnants of dirt and/or organic debris, such as skins and the like. For example, the raw protein source may be rinsed in water having a temperature from about 10° C. to about 20° C. In embodiments where the protein product comprises peanuts, the peanuts may contain, for example, from about 10 wt. % to about 15 wt. % water after the washing step.

In some embodiments, the protein source is optionally sterilized after washing or instead of washing. For example, in some embodiments the protein source may be steam sterilized or steam pasteurized after washing or instead of washing to mitigate or eliminate any microbial load within the protein source. In embodiments, the optional sterilization may be steam pasteurization at a temperature of approximately 220° F. (104.4° C.) for a time of approximately 20 minutes.

After the optional washing step, the protein source is further processed, such as by heating, to mitigate off-flavors due to volatile organic aroma compounds. This heating step may also reduce the microbial load within the protein source. For example, where the protein source includes peanuts, the raw peanuts may contain medium chain aldehydes (i.e., aldehydes with C6-C10 carbon chains), such as hexanal or the like, and which may impart a grassy or beany flavor to the raw peanuts. It has been found that heating the protein source may mitigate the off flavors imparted by the medium chain aldehydes by volatilizing the organic aroma compounds, effectively driving the compounds from the peanuts. However, it has also been found that heating the protein source may promote the development of other volatile organic aroma compounds, such as pyrazines and the like, which may further contribute an off flavor to the protein source. For example, where the protein source includes peanuts, roasting the peanuts for extended periods of time and/or at higher temperatures causes pyrazine compounds to develop which impart a strong, roasted flavor to the peanuts. This roasted flavor is undesirable in a dairy milk substitute. Accordingly, in the embodiments described herein, the protein source is processed under conditions which reduce the volatile organic aroma compounds in the raw protein source (such as medium chain aldehydes) while mitigating and/or eliminating the development of additional volatile organic aroma compounds (such as pyrazines).

In the embodiments described herein, it has been determined that certain ratios of the total concentration of medium chain aldehydes in the protein source to the total concentration of pyrazines in the protein source, as determined by gas chromatography-mass spectrometry, reduce and/or mitigate the occurrence of off flavors in the resultant protein product. In the embodiments described herein, following processing by heating, the ratio of the total concentration of medium chain aldehydes in the protein source to the total concentration of pyrazines in the protein source is greater than or equal to about 0.5 and less than or equal to about 45. It has been found that when the ratio is less than about 0.5, the resulting protein product will have an undesirable roasted or burnt flavor. However, when the ratio is greater than about 45, the resulting protein product will have an undesirable "grassy" or "beany" flavor. In some embodiments, following processing by heating, the ratio of the total concentration of medium chain aldehydes in the protein source to the total concentration of pyrazines in the protein source is greater than or equal to about 0.5 and less than or equal to about 20. In some embodiments, following processing by heating, the ratio of the total concentration of medium chain aldehydes in the protein source to the total concentration of pyrazines in the protein source is greater than or equal to about 0.75 and less than or equal to about 10. In some other embodiments, following processing by heating, the ratio of the total concentration of medium chain aldehydes in the protein source to the total concentration of pyrazines in the protein source is greater than or equal to about 1 and less than or equal to about 5. Analytical methods for determining the ratio of the total concentration of medium chain aldehydes to the total concentration of pyrazines will be described in further detail in Example 1, below.

The specified ratios of the total concentration of medium chain aldehydes in the protein source to the total concentration of pyrazines may be obtained by processing the protein source within a certain range of applied heat loads. For a given temperature and heating time, the heat load $F_0$ is the equivalent exposure time to a temperature of 122.11° C. More specifically, the heat load $F_0$ is defined as:

$$F_0 = \Delta t \sum 10^{\frac{(T-121)}{z}}$$

where:

T is the temperature of the protein source at time t;

Δt is the time interval between measurements of the temperature T; and z is the temperature coefficient, assumed to be 10° C.

In the embodiments described herein, the desired ratio of the total concentration of medium chain aldehydes in the protein source to the total concentration of pyrazines in the protein source may be achieved by processing the protein source under a heat load greater than or equal to about 3. For example, in some embodiments, the protein source may be processed under a heat load greater than or equal to about 3 and less than or equal to about 2000. In some embodiments, the protein source may be processed under a heat load greater than or equal to about 15 and less than or equal to about 1800. In some other embodiments, the protein source may be processed under a heat load greater than or equal to about 20 and less than or equal to about 1600. In still other embodiments, the protein source may be processed under a heat load greater than or equal to about 25 and less than or equal to about 1400. In yet other embodiments, the protein source may be processed under a heat load greater than or equal to about 30 and less than or equal to about 1200. In some other embodiments, the protein source may be processed under a heat load greater than or equal to about 35 and less than or equal to about 1000. In some other embodiments, the protein source may be processed under a heat load greater than or equal to about 3 and less than or equal to about 500. In some embodiments, the protein source may be processed under a heat load greater than or equal to about 15 and less than or equal to about 250. In some other embodiments, the protein source may be processed under a heat load greater than or equal to about 20 and less than or equal to about 125. In still other embodiments, the protein source may be processed under a heat load greater than or equal to about 25 and less than or equal to about 80. In yet other embodiments, the protein source may be processed under a heat load greater than or equal to about 30 and less than or equal to about 60. In some other embodiments, the protein source may be processed under a heat load greater than or equal to about 35 and less than or equal to about 50.

In embodiments, the aforementioned heat loads are achieved by heating the protein source in air at a processing temperature greater than or equal to about 238° F. (114.4° C.) and less than or equal to about 310° F. (154.4° C.). In some other embodiments, the processing temperature may be greater than or equal to about 250° F. (121.1° C.) and less than or equal to about 300° F. (148.8° C.). In still other embodiments, the processing temperature may be greater than or equal to about 250° F. (121.1° C.) and less than or equal to about 290° F. (154.4° C.). In still other embodiments, the processing temperature may be greater than or equal to about 250° F. (121.1° C.) and less than or equal to about 285° F. (140.6° C.). In still other embodiments, the processing temperature may be greater than or equal to about 250° F. (121.1° C.) and less than or equal to about 310° F. (154.4° C.). In still other embodiments, the processing temperature may be greater than or equal to about 255° F. (123.9° C.) and less than or equal to about 310° F. (154.4° C.). In still other embodiments, the processing temperature may be greater than or equal to about 265° F. (129.4° C.) and less than or equal to about 310° F. (154.4° C.). In still other embodiments, the processing temperature may be greater than or equal to about 275° F. (135° C.) and less than or equal to about 310° F. (154.4° C.). In still other embodiments, the processing temperature may be greater than or equal to about 280° F. (137.8° C.) and less than or equal to 3 about 10° F. (154.4° C.).

The protein source may be processed at the processing temperature for a processing time sufficient for the tree nuts to be subjected to the specified heat load. In embodiments, the processing time is greater than or equal to about 10 minutes and less than or equal to about 120 minutes. In some other embodiments, the processing time is greater than or equal to about 10 minutes and less than or equal to about 60 minutes. In still other embodiments, the processing time is greater than or equal to about 15 minutes and less than or equal to about 40 minutes. In yet other embodiments, the processing time is greater than or equal to about 15 minutes and less than or equal to about 35 minutes.

In embodiments, a desired heat load may be achieved by processing the protein source at, for example, about 238° F. (114.4° C.) for about 15 minutes. Alternatively, a desired heat load may be achieved by processing the protein source at, for example, about 255° F. (123.9° C.) for about 20 minutes or even about 265° F. (129.4° C.) for about 20 minutes. In yet an alternative, a desired heat load may be achieved by processing the protein source at, for example, about 285° F. (140.6° C.) for 20 minutes or even about 310° F. (154.4° C.) for about 15 minutes. It should be understood that the foregoing temperature and time combinations are for purposes of illustration only and that other combinations of time and temperature may suitable for obtaining a heat load greater than or equal to about 3 and less than or equal to about 200 as described herein.

While processing the protein source at elevated temperatures reduces the off flavors associated volatile organic aroma compounds, it also reduces the water content of the protein source which, in turn, alters the mechanical properties of the protein source, making it easier to obtain a desired particle size distribution in subsequent grinding operations. For example, in embodiments where the protein source include peanuts, the peanuts may have a moisture content greater than or equal to about 0.5 wt. % and less than or equal to about 4 wt. % water by weight of the protein source after heating. The reduction in moisture from, for example, about 10 wt. % or greater by weight makes the peanuts more brittle and more readily fractured into smaller component parts in a subsequent grinding operation. In embodiments, after processing at elevated temperatures, the protein source has a moisture content greater than or equal to about 0.5 wt. % and less than or equal to about 3 wt. % by weight. In some other embodiments, after processing at elevated temperatures, the protein source has a moisture content greater than or equal to about 0.75 wt. % and less than or equal to about 2 wt. % by weight.

After processing at elevated temperatures, the protein source is ground to a protein paste which consists of particulate matter and the oil and fat from the protein source. It should be understood that the particulate matter includes protein but may also include carbohydrates, fiber, and fat. In the embodiments described herein, the protein source is ground without the addition of any further processing aids or fluids (i.e., water, oil or the like). The protein source is ground such that the resultant protein paste includes particulate matter (i.e., tree nut and/or legume particles) with an average particle size of less than or equal to about 50 microns. For example, in some embodiments the average particle size of the particulate matter in the protein paste is less than or equal to about 45 microns or even less than or equal to about 40 microns. In some embodiments, the average particle size of the particulate matter in the protein paste is less than or equal to about 35 microns or even less than or equal to about 30 microns. In still other embodiments, the average particle size of the particulate matter in the protein paste is less than or equal to about 20 microns. Decreasing the average particle size of the protein paste to less than about 50 microns or even less than about 45 microns prevents the detection of the individual particulates by the human tongue, providing a consumable product which does not have a perceived "gritty" texture.

After the protein source is ground to a protein paste, the protein paste is combined with water and blended to form a mixture of protein paste and water with particulate matter contributed to the mixture by the protein paste suspended in the water. In the embodiments described herein, the mixture of protein paste and water includes greater than or equal to about 0.5 wt. % and less than or equal to about 35 wt. % protein paste. For example, in some embodiments, the mixture of protein paste and water includes greater than or equal to about 5 wt. % and less than or equal to about 30 wt. % protein paste. In some other embodiments, the mixture of protein paste and water includes greater than or equal to about 5 wt. % and less than or equal to about 25 wt. % protein paste. In some other embodiments, the mixture of protein paste and water includes greater than or equal to about 5 wt. % and less than or equal to about 20 wt. % protein paste. In still other embodiments, the mixture of protein paste and water includes greater than or equal to about 5 wt. % and less than or equal to about 15 wt. % protein paste.

In embodiments, the ratio of protein paste to water in the mixture may be from about 1:4 to about 1:9. For example, in embodiments, the ratio of protein paste to water in the mixture may be from about 1:5 to about 1:8 or even from about 1:5 to about 1:7.

In some embodiments, the mixture of protein paste and water may be optionally filtered to remove larger particulates which may be detectable by the human tongue, thereby further reducing the average particle size of the mixture to less than about 50 microns. For example, in some embodiments, the mixture of protein paste and water may be passed through a filter and/or sieve which passes particulate matter less than or equal to about 50 microns and traps the particulate matter greater than about 50 microns. In some other embodiments, the mixture of protein paste and water may be passed through a filter and/or sieve which passes particulate matter less than or equal to about 45 microns and traps particulate matter greater than about 45 microns. In still other embodiments, the mixture of protein paste and water may be passed through a filter and/or sieve which passes particulate matter less than or equal to about 40 microns and traps particulate matter greater than about 40 microns. However, it should be understood that this filtering step is optional and that, in other embodiments, the mixture of protein paste and water is not filtered.

Thereafter, excess oil/fat is removed from the mixture. Specifically, the mixture of protein paste and water may be heated in a separator, such as a cream separator, centrifuge or the like, to at least partially remove the oil/fat from the mixture. In embodiments, the mixture of protein paste and water is heated to a temperature from about 122° F. (50° C.) to about 194° F. (90° C.) prior to being introduced into the separator or while resident in the separator. After being passed through the separator, the mixture contains less than or equal to about 4.0 wt. % oil and fat by weight of the mixture or even less than or equal to about 3.0 wt. % oil and fat by weight of the mixture. For example, in some embodiments, the mixture may contain greater than or equal to about 0.5 wt. % and less than or equal to about 4.0 wt. % oil and fat by weight of the mixture after being passed through the separator. In some other embodiments, the mixture may contain greater than or equal to about 0.5 wt. % and less than or equal to about 3.0 wt. % oil and fat by weight of the mixture after being passed through the separator. In some other embodiments, the mixture may contain greater than or equal to about 1.0 wt. % and less than or equal to about 2.0 wt. % oil and fat by weight of the mixture after being passed through the separator.

After the oil and fat is separated from the remainder of the mixture, the mixture may be homogenized at elevated temperatures and pressures and sterilized. In some embodiments, the mixture is first homogenized and then sterilized while, in some other embodiments, the mixture is homogenized as part of the sterilization process or homogenized after the sterilization process.

Homogenization aids in reducing the size of oil/fat particles in the mixture and also prevents aggregation of particles in the mixture. In embodiments, the mixture may be homogenized at temperatures greater than or equal to about 158° F. (70° C.) or even greater than or equal to about 167° F. (75° C.). In embodiments, the mixture may be homogenized at pressures greater than or equal to about 3000 psi or even greater than or equal to about 5000 psi. In some embodiments the mixture may be homogenized in consecutive steps in which the pressure is increased during each consecutive step. For example, in some embodiments, the mixture may be homogenized in a two step process in which the temperature is greater than or equal to about 158° F. (70° C.) and the pressure is about 3000 psi in the first step and the temperature is greater than or equal to about 158° F. (70° C.) and the pressure is about 5000 psi in the second step.

In the embodiments described herein, sterilization may be done indirectly, without co-mingling the sterilization utility (e.g., steam, hot water, etc.) with the mixture. It has been unexpectedly found that the use of indirect sterilization provides for a desirable aggregation of the proteins in the mixture, increasing the protein size and improving the mouth feel and texture of the product. In embodiments, the mixture may be sterilized, for example, by indirect tube and shell sterilization or, alternatively, indirect scrape surface sterilization, each of which are described in further detail below.

Referring now to FIG. 1, an indirect tube and shell sterilization process 100 is schematically depicted. In this sterilization process, the mixture may be initially heated from approximately 45° F. (7.2° C.) to approximately 185° F. (85° C.) or even 240° F. (115.6° C.) in a pre-heater 102. In embodiments, the pre-heater 102 may be, for example, a plate-frame heat exchanger which isolates the mixture from the heating utility. Thereafter, the mixture is passed to a homogenizer 104 where the mixture is homogenized. In embodiments, the mixture may be homogenized at, for example, a temperature of 185° F. and a pressure of 3500 psi.

The mixture is then passed to a tubular heater 106 where the mixture is heated and sterilized. In embodiments, the tubular heater 106 comprises a tube-in-shell design in which the mixture being sterilized is carried within an inner tube and the heating utility, such as steam and/or water, is carried in a space between the inner tube and a shell surrounding the inner tube such that the heating utility and the mixture are isolated from one another (i.e., the heating utility and the mixture are not co-mingled). In embodiments, the heating utility is provided at a temperature suitable to heat the mixture to a sterilization temperature from greater than or equal to about 265° F. (129.4° C.) to less than or equal to about 285° F. (140.6° C.) and held at the sterilization temperature for a time period from greater than or equal to about 5 seconds to less than or equal to about 15 seconds in order to sterilize the mixture. In embodiments, the mixture is held at 275° F. (135° C.) for a holding period of 7 seconds in order to complete the sterilization process.

After sterilization in the tubular heater 106, the mixture is passed to a cooler where the mixture is cooled. In embodiments, the cooler may be a tubular cooler 108 as depicted in FIG. 1. The tubular cooler 108 comprises a tube-in-shell design in which the mixture is carried within an inner tube and the cooling utility, such as water or a coolant, is carried in a space between the inner tube and a shell surrounding the inner tube such that the cooling utility and the mixture are isolated from one another (i.e., the cooling utility and the mixture are not co-mingled). While FIG. 1 depicts the use of a tubular cooler 108, it should be understood that other types of coolers and/or combinations of coolers are contemplated and possible. In embodiments, the cooling utility may be provided at a temperature suitable to cool the mixture to a temperature of, for example, approximately 45° F. (7.2° C.).

Figure 2:
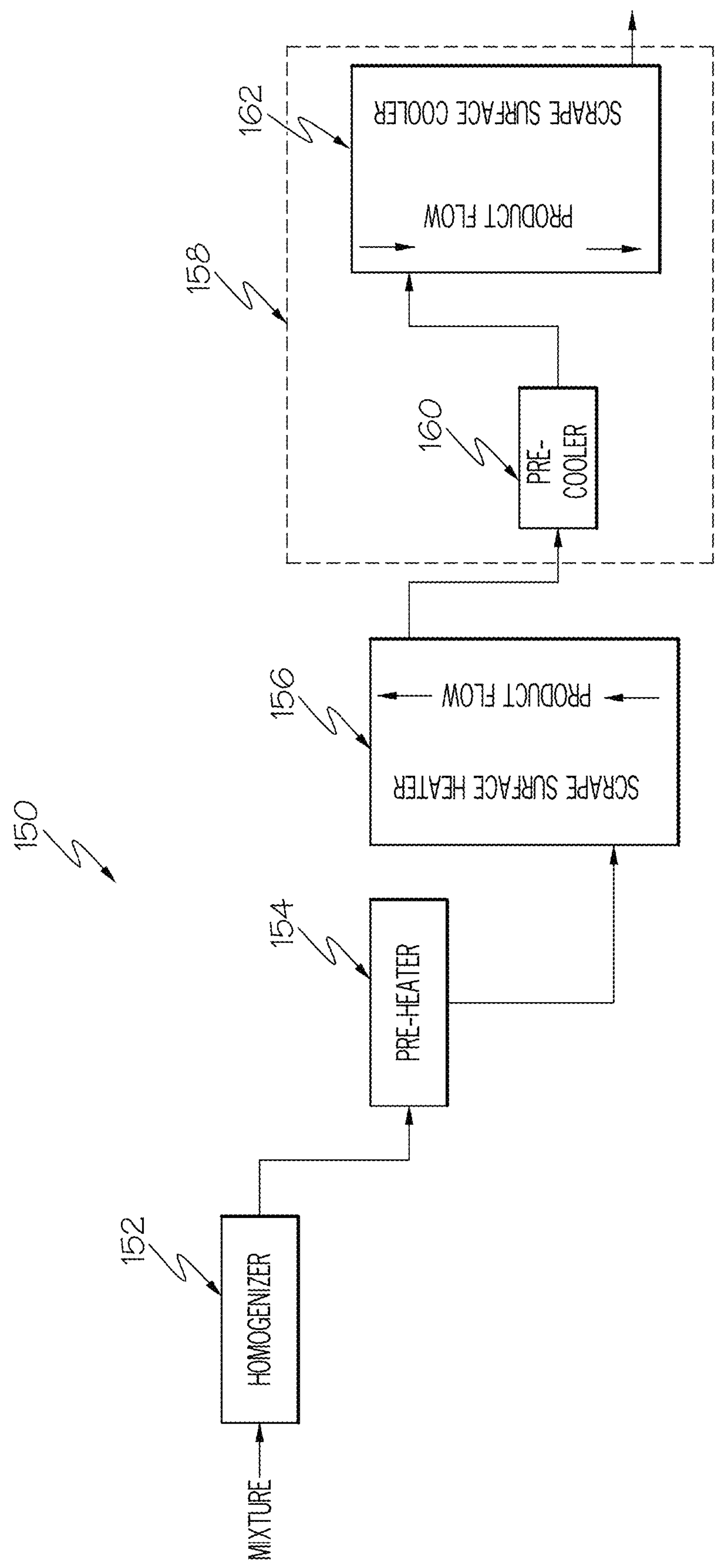
FIG. 2 schematically depicts another indirect sterilization process according to one or more embodiments shown and described herein.

In another embodiment, the mixture may be sterilized in an indirect scrape surface process as depicted in FIG. 2. Like the indirect tube and shell process 100 of FIG. 1, the indirect scrape surface process 150 of FIG. 2 prevents the co-mingling of the heating utility and the mixture, thereby allowing for the aggregation of proteins in the mixture. In embodiments, the indirect scrape surface process 150 may include initially homogenizing the mixture in a homogenizer 152. In embodiments, the mixture may be homogenized at, for example, a temperature of approximately 165° F. (74° C.) and a pressure of 3500 psi.

Thereafter, the mixture is passed to a pre-heater 154 where the mixture is heated from the homogenization temperature to a temperature within a range from greater than or equal to about 165° F. (74° C.) to less than or equal to about 240° F. (115.6° C.). In embodiments, the mixture may be heated in the pre-heater 154 to a temperature within a range from greater than or equal to about 185° F. (85° C.) to less than or equal to about 200° F. (93.3° C.). In embodiments, the pre-heater 154 may be, for example, a plate-frame heat exchanger which isolates the mixture from the heating utility.

Thereafter, the mixture is passed from the pre-heater 154 to a scrape surface heater 156 where the mixture is heated to a sterilization temperature from greater than or equal to about 265° F. (129.4° C.) to less than or equal to about 285° F. (140.6° C.). The mixture is exposed to the sterilization temperature for a time period from greater than or equal to about 5 seconds to less than or equal to about 15 seconds in order to sterilize the mixture. The scrape surface heater generally comprises a vessel which includes a rotating stirrer engaged with the sidewalls of the vessel to agitate product within the vessel. The vessel further includes an outer shell or coils through which a heating utility is circulated to heat the product within the vessel without co-mingling the heating utility and the product. The mixture is introduced into the scrape surface heater 156 proximate the bottom of the vessel, heated within the vessel, and the heated mixture is extracted from the vessel proximate the top of the vessel.

The mixture is then passed to a cooler 158 where the mixture is cooled. In embodiments, the mixture may exit the cooler at a temperature of approximately 45° F. (7.2° C.). In embodiments the cooler 158 may include a pre-cooler 160 and a scrape surface cooler 162. The pre-cooler 160 may be utilized to cool the mixture from approximately 275° F. (135° C.) to approximately 65° F. (18.3° C.) or even 60° F. (15.6° C.). The pre-cooler 160 may be, for example, a plate-frame heat exchanger which isolates the mixture from the cooling utility. Alternatively, the pre-cooler 160 may be a tubular cooler, as described above with respect to FIG. 1. In embodiments, the cooler 158 may further include a scrape surface cooler 162. The scrape surface cooler 162 may further cool the mixture to a temperature of approximately 45° C. upon exiting the pre-cooler 160. The scrape surface cooler 162 generally comprises a vessel which includes a rotating stirrer engaged with the sidewalls of the vessel to agitate product within the vessel. The vessel further includes an outer shell or coils through which a cooling utility, such as water or coolant, is circulated to cool the product within the vessel without co-mingling the cooling utility and the product. The mixture is introduced into the scrape surface cooler 162 proximate the top of the vessel, cooled within the vessel, and the cooled mixture is extracted from the vessel proximate the bottom of the vessel.

While FIG. 2 depicts the use of a cooler 158 which includes a pre-cooler 160 and a scrape surface cooler 162, it should be understood that other types of coolers and/or combinations of coolers are contemplated and possible.

While two methods of indirect sterilization have been described herein, it should be understood that other methods and processes are contemplated and possible. Further, while specific ranges of temperatures and times have been provided for various portions of the indirect sterilization methods of FIGS. 1 and 2, it should be understood that these temperatures and times are for purposes of illustration and that variations in the temperature and/or times may be used to achieve the same results with respect to the aggregation of proteins in the mixture.

As noted hereinabove, it has been unexpectedly found that the use of indirect sterilization methods, such as the indirect tube and shell sterilization method and the indirect scrape surface sterilization method, results in the aggregation of proteins in the mixture that increases the average protein aggregate size and provides a more desirable mouth feel and texture to the mixture. These protein aggregates may include, without limitation, protein, fat droplets, and starch.

In the embodiments described herein, after sterilization, the mixture comprises protein aggregates which have an average particle size of greater than or equal to about 4 microns. These protein aggregates are generally loose, low-density structures which contribute to the smooth texture of the mixture in the mouth. In embodiments, the mixture comprises protein aggregates which have an average aggregate particle size of greater than or equal to about 4 microns and less than or equal to about 150 microns. In some embodiments, after sterilization, the mixture comprises protein aggregates which have an average aggregate particle size of greater than or equal to about 4 microns and less than or equal to about 70 microns. In some other embodiments, after sterilization, the mixture comprises protein aggregates which have an average aggregate particle size of greater than or equal to about 4 microns and less than or equal to about 35 microns. In still other embodiments, after sterilization, the mixture comprises protein aggregates which have an average aggregate particle size of greater than or equal to about 4 microns and less than or equal to about 15 microns. In some other embodiments, after sterilization, the mixture comprises protein aggregates which have an average aggregate particle size of greater than or equal to about 4 microns and less than or equal to about 12 microns. In some other embodiments, after sterilization, the mixture comprises protein aggregates which have an average aggregate particle size of greater than or equal to about 4 microns and less than or equal to about 10 microns.

It should now be understood that the resultant protein product comprises a mixture of water and particulate matter comprising protein which may be consumed as a beverage, for example. The protein product may include additional additives including, without limitation, preservatives, colorants, sweeteners, and the like, in addition to the mixture. As noted hereinabove, the protein source which provide the protein content to the beverage are processed to minimize the contribution of off flavors due to volatile organic aroma compounds from the protein source. While most of these volatile organic aroma compounds are eliminated or mitigated by processing the raw protein source at elevated temperatures prior to forming the mixture, it is hypothesized that volatile organic aroma compounds may develop during subsequent processing steps, such as during separation, homogenization and sterilization. Accordingly, in each of these processing steps, the temperature of the mixture is controlled to mitigate the evolution of volatile organic aroma compounds which may alter the flavor of the protein product.

In the embodiments described herein, the mixture of water and protein source includes, after sterilization, medium chain aldehydes and pyrazines with a ratio of the total concentration of medium chain aldehydes in the mixture to a total concentration of pyrazines in the mixture, as determined by gas chromatography-mass spectrometry, greater than or equal to about 0.5 and less than or equal to about 45. In embodiments, the ratio of the total concentration of medium chain aldehydes in the mixture to a total concentration of pyrazines in the mixture is greater than or equal to about 0.5 and less than or equal to about 20. In still other embodiments, the ratio of the total concentration of medium chain aldehydes in the mixture to a total concentration of pyrazines in the mixture is greater than or equal to about 0.75 and less than or equal to about 10. In yet other embodiments, the ratio of the total concentration of medium chain aldehydes in the mixture to a total concentration of pyrazines in the mixture is greater than or equal to about 1 and less than or equal to about 5. In embodiments, the ratio of the total concentration of medium chain aldehydes in the mixture to a total concentration of pyrazines in the mixture, as determined by gas chromatography-mass spectrometry, is greater than or equal to about 1, or even greater than or equal to about 2, and less than or equal to about 45. In embodiments, the ratio of the total concentration of medium chain aldehydes in the mixture to a total concentration of pyrazines in the mixture is greater than or equal to about 3 and less than or equal to about 45. In embodiments, the ratio of the total concentration of medium chain aldehydes in the mixture to a total concentration of pyrazines in the mixture is greater than or equal to about 1, or even greater than or equal to about 2, and less than or equal to about 20. In embodiments, the ratio of the total concentration of medium chain aldehydes in the mixture to a total concentration of pyrazines in the mixture is greater than or equal to about 3 and less than or equal to about 20. In still other embodiments, the ratio of the total concentration of medium chain aldehydes in the mixture to a total concentration of pyrazines in the mixture is greater than or equal to about 1, or even greater than or equal to about 2, and less than or equal to about 10. In still other embodiments, the ratio of the total concentration of medium chain aldehydes in the mixture to a total concentration of pyrazines in the mixture is greater than or equal to about 3 and less than or equal to about 10. In yet other embodiments, the ratio of the total concentration of medium chain aldehydes in the mixture to a total concentration of pyrazines in the mixture is greater than or equal to about 1 and less than or equal to about 5.

According to some embodiments, the mixture may further include pH buffers in addition to water and the protein paste. The pH buffers protect against separation of the protein from the water when the mixture is added to an acidic environment, such as, for example, coffee or tea. Without being bound to any particular theory, it is believed that proteins generally stay in solution when they are positively or negatively charged because they are attracted to oppositely charged particles of the solvent. For instance, a positively charged protein is attracted to negatively charged particles in the solvent, thereby preventing flocculation of the proteins and, ultimately, preventing sedimentation. However, it is believed that the isoelectric point of the proteins in the mixture is higher than the pH of beverages to which the mixture is likely to be added, such as, for example, coffee and tea. In this case, when the mixture of protein paste and water is added to such beverages, the resulting solution may have a pH at or below the isoelectric point of the proteins. When this happens, the charge of the proteins in the mixture is approximately neutral and the proteins in the mixture are not attracted to positively or negatively charged particles in the solvent. Accordingly, when the proteins are in a system with a pH at or below their isoelectric point, the proteins are less likely to stay in solution and can flocculate and form undesirable sediment in the beverage.

To prevent sedimentation of the proteins when the mixture is added to a beverage, one or more pH buffer(s) may be added to the mixture so that when the mixture is added to an acidic environment (such as coffee or tea), the resulting combination does not have a pH that is near or below the isoelectric point of the protein, thereby preventing sedimentation of the protein. But, the buffer system also should not negatively alter the flavor profile of the protein paste and water mixture. Finding a pH buffer that is soluble in the protein paste and water mixtures, does not negatively affect the flavor profile of the protein paste and water mixture, and provides the pH buffering necessary to alter the pH of an acid environment so that the acidic environment does not have a pH near or below the isoelectric point of the proteins, is a difficult task. It was found that some traditional food-grade pH buffers, such as phosphate-based pH buffers, do not provide the required buffering, and flocculation and sedimentation still occurred when using the phosphate-based buffers. Further, other buffers, such as calcium carbonate, are not very soluble in the protein paste and water mixture and cannot be added to the mixture in large enough amounts to provide the necessary buffering. To balance these considerations, in embodiments, a protein product comprises protein paste, water, sodium bicarbonate ($NaHCO_3$), calcium carbonate ($CaCO_3$), and a stabilizer.

It was found that sodium bicarbonate increases the pH of the protein paste and water mixture. Sodium bicarbonate is highly soluble in water and can be added to the mixture in large quantities. However, adding too much sodium bicarbonate to the mixture can lead to a noticeable metallic taste. In embodiments, sodium bicarbonate is included in the protein paste and water mixture in an amount greater than or equal to about 0.10 wt. % of the mixture and less than or equal to about 0.50 wt. % of the mixture, such as greater than or equal to about 0.20 wt. % of the mixture and less than or equal to about 0.40 wt. % of the mixture. In other embodiments, sodium bicarbonate is included in the protein paste and water mixture in an amount greater than or equal to about 0.10 wt. % of the mixture and less than or equal to about 0.25 wt. % of the mixture. In still other embodiments, sodium bicarbonate is included in the protein paste and water mixture in an amount greater than or equal to about 0.25 wt. % of the protein product and less than or equal to about 0.50 wt. % of the mixture, such as greater than or equal to about 0.30 wt. % of the mixture and less than or equal to about 0.45 wt. % of the mixture.

As stated above, sodium bicarbonate is a useful buffer because, in part, sodium bicarbonate is highly soluble in water. However, when sodium bicarbonate is used as the only buffer in the protein paste and water mixture, the amount of sodium bicarbonate required to provide the necessary buffering causes the mixture to have a metallic flavor. Accordingly, in embodiments, calcium carbonate is added to the protein product to provide additional buffering. As mentioned above, although calcium carbonate is a strong buffer, it is not very soluble in water and will precipitate out of solution if too much is added to the protein paste and water mixture. In embodiments, calcium carbonate is included in the protein paste and water mixture in an amount greater than or equal to about 0.30 wt. % and less than or equal to about 0.80 wt. % of the mixture, such as greater than or equal to about 0.40 wt. % of the mixture and less than or equal to about 0.70 wt. % of the mixture. In other embodiments, calcium carbonate is included in the protein paste and water mixture in an amount greater than or equal to about 0.30 wt. % of the mixture and less than or equal to about 0.60 wt. % of the mixture, such as greater than or equal to about 0.35 wt. % and less than or equal to about 0.55 wt. % of the mixture.

According to embodiments, the ratio of sodium bicarbonate and calcium carbonate in the mixture is balanced to provide the desired amount of buffering and solubility. If the ratio of sodium bicarbonate to calcium carbonate is too high, the amount of buffering will not be adequate to maintain the pH of a solution comprising the mixture and a low-pH beverage (such as, for example, coffee or tea) above the isoelectric point of the proteins. However, if the ratio of sodium bicarbonate to calcium carbonate is too low, the buffers, such as calcium carbonate, will not be soluble in the mixture. Accordingly, in embodiments, the ratio of sodium bicarbonate to calcium carbonate in the mixture is from greater than or equal to about 1.00:1.60 to less than or equal to about 1.00:2.60, such as from greater than or equal to about 1.00:1.80 to less than or equal to about 1.00:2.40. In other embodiments, the ratio of sodium bicarbonate to calcium carbonate in the mixture is from greater than or equal to about 1.00:1.90 to less than or equal to about 1.00:2.30, such as from greater than or equal to about 1.00:2.00 to less than or equal to about 1.00:2.10.

The pH buffer system may be added to the protein product to raise the pH of the mixture so that when the mixture is added to an acidic environment, the pH of the composition is above the isoelectric point of the proteins in the mixture. In embodiments, the pH of the mixture comprising the pH buffers is from greater than or equal to about 7.60 to less than or equal to about 8.40, such as from greater than or equal to about 7.70 to less than or equal to about 8.30. In other embodiments, the pH of the mixture comprising the pH buffers is from greater than or equal to about 7.80 to less than or equal to about 8.20, such as from greater than or equal to about 7.90 to less than or equal to about 8.10. In way of contrast, and as an example only, the isoelectric point of the proteins in the mixture is from about 6.0 to about 6.4, such as about 6.2.

Accordingly, it should be understood that embodiments of the mixture of the protein paste and water (i.e., the protein product) may comprise pH buffers, including, without limitation, when the protein product is formulated for use as an enhancer for acidic beverages such as coffee or tea. However, it should be understood that these buffers are optional and that, in some embodiments, the protein product may be formulated without pH buffers.

In embodiments, stabilizers, such as starches and/or gums are added to the mixture to promote the suspension of particulates, particularly the suspension of protein particulates, in the water. Stabilizers may be added to mixtures that are formulated with pH buffers and without pH buffers. Suitable gum stabilizers include, without limitation, one or more of xanthan gum, cellulose gum, cellulose gel, and carageenan gum. Suitable starch stabilizers include, without limitation, corn starch, tapioca starch, potato starch, and other similar starches. If too little stabilizer is added to the mixture, the protein solids may fall out of suspension. However, if too much stabilizer is added to the mixture, the stabilizer may introduce off-notes in the protein product and/or may cause the stabilizer to form a gel in the mixture, both of which are undesirable. In embodiments, the stabilizer is included in the mixture in an amount greater than or equal to about 0.10 wt. % of the mixture and less than or equal to about 0.80 wt. % of the mixture, such as greater than or equal to about 0.20 wt. % of the mixture and less than or equal to about 0.60 wt. % of the mixture. In other embodiments, the stabilizer is included in the mixture in an amount greater than or equal to about 0.30 wt. % of the mixture and less than or equal to about 0.50 wt. % of the mixture, such as greater than or equal to about 0.35 wt. % of the mixture and less than or equal to about 0.45 wt. % of the mixture. In some embodiments, the stabilizer comprises cellulose gum and cellulose gel gum greater than or equal to about 0.05 wt. % of the mixture and less than or equal to about 0.20 wt. % of the mixture, such as greater than or equal to about 0.10 wt. % of the mixture and less than or equal to about 0.15 wt. % of the mixture.

In embodiments, the mixture contains greater than or equal to about 0.5 wt. % and less than or equal to about 8 wt. % total protein by weight of the mixture. For example, in some embodiments, the protein product may contain greater than or equal to about 0.5 wt. % and less than or equal to about 6 wt. % total protein by weight of the mixture. In still other embodiments, the protein product may contain greater than or equal to about 1.0 wt. % and less than or equal to about 5 wt. % total protein by weight of the mixture. In still other embodiments, the protein product may contain greater than or equal to about 2.0 wt. % and less than or equal to about 4 wt. % total protein by weight of the mixture.

In embodiments, the mixture contains greater than or equal to about 1 gram and less than or equal to about 20 grams of protein per 240 ml of the mixture. For example, the mixture may contain greater than or equal to about 5 grams and less than or equal to about 20 grams of protein per 240 ml of the mixture. In embodiments, the mixture contains greater than or equal to about 1 gram or even 5 grams and less than or equal to about 15 grams of protein per 240 ml of the mixture. In other embodiments, the mixture contains greater than or equal to about 6 grams and less than or equal to about 10 grams of protein per 240 ml of the mixture or even greater than or equal to about 7 grams and less than or equal to about 10 grams of protein per 240 ml of the mixture. In still other embodiments, the mixture contains greater than or equal to about 8 grams and less than or equal to 10 grams of protein per 240 ml of the mixture.

The size of the particulate matter comprising protein in the mixture is dictated by the grinding and optional filtering steps described hereinabove.

In the embodiments described herein, the mixture of protein paste and water includes greater than or equal to about 40 wt. % and less than or equal to about 98 wt. % water. For example, in some embodiments, the mixture of protein paste and water includes greater than or equal to about 50 wt. % and less than or equal to about 95 wt. % water. In some other embodiments, the mixture of protein paste and water includes greater than or equal to about 55 wt. % and less than or equal to about 95 wt. % water. In some other embodiments, the mixture of protein paste and water includes greater than or equal to about 60 wt. % and less than or equal to about 90 wt. % water. In still other embodiments, the mixture of protein paste and water includes greater than or equal to about 65 wt. % and less than or equal to about 85 wt. % water. In still other embodiments, the mixture of protein paste and water includes greater than or equal to about 70 wt. % and less than or equal to about 85 wt. % water.

As noted hereinabove the consistency of the mixture (and therefore the consistency of the protein product) can be controlled by adjusting the percentage of water in the mixture. For example, decreasing the water content may thicken the mixture, providing a protein product having the consistency of a "smoothie" or a "shake." However, increasing the water content may thin the mixture, providing a protein product having a consistency more akin to dairy milk.

Adjusting the water content in the mixture also adjusts the viscosity of the mixture. In the embodiments described herein the mixture of protein paste and water in the protein product has a viscosity greater than or equal to about 15 centipoise (cP) and less than or equal to about 250 cP. In embodiments, the viscosity of the mixture of protein paste and water is greater than or equal to about 15 cP and less than or equal to about 200 cP. In some embodiments, the mixture of the protein paste and water in the protein product has a viscosity greater than or equal to about 20 cP and less than or equal to about 150 cP. In some other embodiments, the mixture of the protein paste and water in the protein product has a viscosity greater than or equal to about 20 cP and less than or equal to about 50 cP.

In embodiments, a sweetener may be optionally added to the mixture of protein paste and water to enhance flavor. In some embodiments, the sweetener may be sucrose derived from sugarcane, however, it should be understood that other natural and artificial sweeteners are contemplated and possible. In embodiments, the sweetener may be added to the mixture of protein paste and water in an amount greater than or equal to about 0 wt. % to less than or equal to about 10 wt. %. In some other embodiments, the sweetener may be added to the mixture of protein paste and water in an amount greater than or equal to about 1 wt. % to less than or equal to about 9 wt. %. In still other embodiments, the sweetener may be added to the mixture of protein paste and water in an amount greater than or equal to about 2 wt. % to less than or equal to about 8 wt. %. In yet other embodiments, the sweetener may be added to the mixture of protein paste and water in an amount greater than or equal to about 3 wt. % to less than or equal to about 7 wt. %.

In embodiments, an anti-foaming agent may be optionally added to the mixture of protein paste and water to reduce foaming during processing and thereafter. In some embodiments, the anti-foaming agent may be, for example, mono-diglyceride(s), mineral oil-based emulsions or vegetable oil-based emulsions or even silicon-based emulsions, however, it should be understood that other anti-foaming agents are contemplated and possible. In embodiments, the anti-foaming agent, when present, may be added to the mixture of protein paste and water in an amount from greater than or equal to about 0.0001 wt. % to less than or equal to about 0.0008 wt. %. In some other embodiments, the anti-foaming agent may be added to the mixture of protein paste and water in an amount greater than or equal to about 0.0002 wt. % to less than or equal to about 0.0007 wt. % or even about 0.0006 wt. %. In still other embodiments, the anti-foaming agent may be added to the mixture of protein paste and water in an amount greater than or equal to about 0.0003 wt. % to less than or equal to about 0.0005 wt. %.

In embodiments, one or more vitamins, minerals, and/or essential acids may be added to the mixture of protein paste and water. In embodiments, the one or more vitamins, minerals, and or essential acids may be a vitamin blend such as, for example a blend of vitamins E, A, D, and B12. However, it should be understood that other vitamins, minerals, and/or essential acids are contemplated and possible. For example, the one or more vitamins, minerals, and/or essential acids may include, without limitation, zinc and/or magnesium, and essential amino acids such as lysine. In embodiments, the one or more vitamins and/or minerals, when present, may be added to the mixture of protein paste and water in an amount greater than or equal to about 0.0005 wt. % to less than or equal to about 0.1 wt. %. In some other embodiments, the one or more vitamins and/or minerals may be added to the mixture of protein paste and water in an amount greater than or equal to about 0.01 wt. % to less than or equal to about 0.07 wt. % or even about 0.06 wt. %. In still other embodiments, the one or more vitamins and/or minerals may be added to the mixture of protein paste and water in an amount greater than or equal to about 0.015 wt. % to less than or equal to about 0.05 wt. %.

In embodiments, one or more flavorings, such as natural and/or artificial flavoring, may be optionally added to the mixture of protein paste and water to enhance flavor. In some embodiments, the flavorings may be, for example vanilla, chocolate, nut blends, dairy, fruit flavors, caramel mocha, and/or various combinations thereof. However, it should be understood that other flavorings and combinations of flavorings are contemplated and possible. In embodiments, the flavorings, when present, may be added to the mixture of protein paste and water in an amount greater than or equal to about 0.02 wt. % to less than or equal to about 2.0 wt. %. In some other embodiments, the flavorings may be added to the mixture of protein paste and water in an amount greater than or equal to about 0.03 wt. % to less than or equal to about 1.75 wt. % or even about 1.5 wt. %. In still other embodiments, the flavorings may be added to the mixture of protein paste and water in an amount greater than or equal to about 0.05 wt. % to less than or equal to about 1.5 wt. %. In yet other embodiments, the flavorings may be added to the mixture of protein paste and water in an amount greater than or equal to about 0.1 wt. % to less than or equal to about 1.0 wt. %. In other embodiments, the flavorings may be added to the mixture of protein paste and water in an amount greater than or equal to about 0.2 wt. % to less than or equal to about 1.0 wt. %.

In embodiments, the mixture of the protein paste and water in the protein product contains less than or equal to about 3 wt. % oil and fat by weight of the mixture. For example, in some embodiments, the mixture may contain greater than or equal to about 0.5 wt. % and less than or equal to about 3.0 wt. % oil and fat by weight of the mixture. In some other embodiments, the mixture may contain greater than or equal to about 1.0 wt. % and less than or equal to about 2.0 wt. % oil and fat by weight of the mixture.

The embodiments described herein will be further clarified by the following examples.

EXAMPLES

Example 1

For this study, 17 peanut paste samples were prepared. The samples were produced from peanuts processed at the temperatures and times listed in Table 1. Table 1 also lists the heat load for each sample, calculated as described hereinabove. One sample (Example 9) of peanut milk (obtained from peanuts processed at 240° F. (115.56° C.), for 35 minutes) was also prepared and analyzed.

TABLE 1

Peanut processing conditions for volatile organic aroma compound analysis

| Sample | Processing Temp (F.) | Processing Time (minutes) | Heat Load (Calculated) |
|---|---|---|---|
| Comparative Example A | 70 | 0 | 1 |
| Comparative Example B | 240 | 10 | 2.783 |
| Comparative Example C | 240 | 15 | 4.174 |
| Comparative Example D | 240 | 20 | 5.565 |
| Example 1 | 240 | 35 | 9.739 |
| Example 2 | 240 | 120 | 33.391 |
| Example 3 | 260 | 10 | 35.938 |
| Example 4 | 260 | 15 | 53.907 |
| Example 5 | 260 | 20 | 71.876 |
| Example 6 | 285 | 10 | 879.92 |
| Example 7 | 285 | 15 | 1319.88 |
| Example 8 | 285 | 20 | 1759.8 |
| Comparative Example E | 295 | 15 | 4743.4 |
| Comparative Example F | 300 | 10 | 5994.8 |
| Comparative Example G | 305 | 5 | 11364 |
| Comparative Example H | 310 | 10 | 21544 |
| Comparative Example I | 310 | 15 | 32317 |
| Example 9 (Peanut Milk) | 240 | 35 | 9.739 |

For peanut paste samples, each sample was prepared using 30 grams of peanut paste prepared from peanuts processed under one of the conditions specified in Table 1. After processing under the specified temperature for the specified time, the peanuts were ground into a peanut paste. For each sample, 30 grams of peanut paste was transferred to a beaker together with 70 mL of water. Samples were homogenized in an Ultra-Turrax homogenizer for 90 seconds to homogenize the mixture of peanut paste and water. Afterwards, 2,3-dimethoxytoluene (Sigma-Aldrich) was added as an internal standard (10 μL of a 300 ppm solution) to get a concentration of 0.1 μg of internal standard per gram of peanut paste. The samples were then homogenized again in the Ultra-Turrax for 60 seconds. Finally, 5 grams of each sample was placed in individual 20 mL vials. PDMS Twisters (Gerstel, 10 mm length, 1 mm film thickness) were immersed in the solutions, and stirred at 600 rpm for 90 minutes. The twisters were then dried before the analysis using 50 mL/min flowing helium at a temperature of 50° C. for 5 minutes.

Each sample was analyzed for the presence of medium chain aldehydes and pyrazines using gas chromatography-mass spectrometry. In particular, analyses were carried out using an Agilent 6890 gas chromatograph coupled with a 5975 mass spectrometer, with a Gerstel TDSA Thermodesorption autosampler, a Gerstel TDS3 Thermal desorption system, and CTS2 Cryo trapping system. Briefly, the desorption of the twisters in the thermal desorption system was done in splitless mode with an initial temperature of 50° C., and a rate of 60° C./min to 240° C., with a hold of 5 minutes. In the cooled injection system, the initial temperature was set at −120° C., with an initial time of 0.20 min. The temperature was increased at 12° C./s to 240° C. and held at this temperature for 8 min. To improve separation, the conditions of the cryogenic trapping system were set at −80° C. (initial time 0.9), and the temperature increased at a rate of 20° C./s to 240° C. and held at this temperature for 1 min. For the injector, solvent vent mode was used (vent time 0 min, vent flow 50 ml/min, purge flow 50 ml/min, purge time 0.70).

The separation was carried out using a VF-WAXMS column from Agilent (30 m×0.25 mm×0.25 um), with an initial flow of 1.2 mL/min. The temperature of the oven was programmed as follows: initial temperature 35° C. with a hold duration of 4 minutes; a first ramp at 3° C./min to 82° C.; and a second ramp of 6° C./min to 220° C., and hold time of 10 min (total run time: 53 min). Acquisition of the data was made in scan mode. Analysis of the samples was done in duplicate or triplicate.

The peanut milk sample was analyzed by placing 5 grams of peanut milk in a 20 mL vial with 23.8 μL of an internal standard solution (3 ppm in ethanol). The sample consisted of 14% peanut paste and 86% water. The amount of internal standard added was calculated to be the same final concentration (0.1 μg IS/g peanut paste) as in the peanut paste samples taking into account that peanut milk was obtained using a proportion of 1 gram peanuts/7 grams total of peanut milk.

After data collection by gas chromatography-mass spectrometry, chromatograms corresponding to the 17 peanut paste samples and the peanut milk sample were analyzed using Chemstation (E.02.02, Agilent). Only those compounds with a mass spectra match factor in the NIST library of 80% or higher were selected. In total, 60 compounds were identified, and for quantification, the main ion was used (Table 2). Results were expressed as relative areas (i.e., area of the main ion compound/area of main ion Internal Standard).

TABLE 2

Compounds identified in peanut paste samples, their retention time (RT) in the chromatogram and the main ion used for quantification purposes. *Compounds selected to obtain the ratio medium chain aldehydes (C6-C10)/total pyrazines: [a]aldehydes; and [b]pyrazines

| RT | Compound | Ion (m/z) | RT | Compound | Ion (m/z) |
|---|---|---|---|---|---|
| 3.73 | 2-octene (Z) | 70 | 20.70 | Pyrazine, 2-ethyl-5-methyl*[b] | 121 |
| 4.27 | Butanal, 2-methyl | 57 | 20.81 | 2-nonanone | 58 |
| 4.34 | Butanal, 3-methyl | 58 | 21.13 | Pyrazine, trimethyl*[b] | 122 |
| 4.74 | Benzene | 78 | 21.20 | Pyrazine, 2-ethyl, 3-methyl*[b] | 121 |
| 5.04 | 3-cyclohepten-1-one | 67 | 21.41 | 3,5-octadien-2-ol | 111 |
| 5.55 | Pentanal | 58 | 21.55 | 1,3-hexadiene,3-ethyl-2-methyl | 67 |
| 6.02 | Decane | 57 | 22.13 | 2-octenal (E)*[a] | 70 |
| 8.42 | Hexanal*[a] | 56 | 22.58 | Pyrazine, 3-ethyl-2,5-dimethyl*[b] | 135 |
| 8.87 | Undecane | 57 | 23.02 | Pyrazine, 2,5-diethyl*[b] | 121 |
| 10.13 | 3-penten-2-one, 4 methyl | 83 | 23.07 | Pyrazine, 2,6-diethyl*[b] | 135 |
| 11.52 | Undecane, 3-methyl | 71 | 23.25 | 1-octen-3-ol | 57 |
| 11.99 | Pyridine | 79 | 23.40 | Furfural | 96 |
| 12.13 | 2-heptanone | 58 | 23.94 | Pyrazine, 2-ethenyl, 6-methyl*[b] | 120 |
| 12.27 | Heptanal | 70 | 24.06 | Pyrazine, 3,5-diethyl-2-methyl*[b] | 149 |
| 12.58 | Limonene | 68 | 24.10 | 2,4-heptadienal (E,E)*[a] | 81 |
| 12.92 | Dodecane | 57 | 24.18 | 2-decanone | 58 |
| 13.51 | 2-hexenal (E)*[a] | 69 | 24.63 | 3-nonen2-one | 125 |
| 13.90 | 4-octanone | 57 | 24.88 | Benzaldehyde | 77 |
| 14.12 | Furan, 2-pentyl | 87 | 25.24 | 2-nonenal*[a] | 70 |
| 14.71 | Nonadecane | 85 | 25.26 | Pyrazine, 2-methyl-3-(2-propenyl)*[b] | 133 |
| 15.26 | 1-pentanol | 70 | 26.16 | Pyridine, 2-hexyl | 93 |
| 15.48 | Pyrazine, methyl-*[b] | 94 | 23.37 | Pyridine, 3-methoxy | 109 |
| 16.42 | 2-octanone | 58 | 27.87 | Benzeneacetaldehyde | 91 |
| 16.61 | Octanal*[a] | 57 | 28.12 | 2,3-dimethoxytoluene (Internal Standard) | 152 |
| 17.23 | Tridecane | 71 | 29.09 | 2,4-nonadienal (E,E)*[a] | 81 |
| 17.82 | Pyrazine, 2,5-dimethyl*[b] | 108 | 30.13 | 2-undecenal | 70 |
| 18.00 | 2-heptenal (E)*[a] | 83 | 30.41 | 2,4-decadienal (E,E)*[a] | 81 |
| 18.35 | Pyrazine, ethyl*[b] | 107 | 31.28 | 2,4-decadienal (E,Z)*[a] | 81 |
| 18.82 | Pyrazine, 2,3-dimethyl*[b] | 108 | 37.83 | 2-methoxy-4-vinylphenol | 150 |
| 20.47 | Pyrazine, 2-ethyl-6-methyl*[b] | 121 | 39.18 | Pyridine, 4-propyl | 93 |

Principal Component Analysis (PCA) was applied to the data from the volatile analysis to examine the relationship between the volatile compounds and the roasting conditions of the peanut pastes (PCA done via JMP software 11.1.1). In addition, a ratio of medium chain aldehydes/pyrazines was obtained for each sample by summing the relative areas of all medium chain aldehydes (C6-C10) and dividing that sum by the sum of the relative areas of all pyrazines. The aldehydes and pyrazines considered in this ratio are specified in Table 2. Table 3 below contains the ratio of medium chain aldehydes to pyrazines for each of the samples analyzed.

TABLE 3

Ratio of medium chain aldehydes:pyrazines for samples processed under different conditions.

| Sample | Ratio |
|---|---|
| Comparative Example A | 632.9094 |
| Comparative Example B | 272.2762 |
| Comparative Example C | 111.408 |
| Comparative Example D | 48.62012 |
| Example 1 | 15.70111 |
| Example 2 | 2.192143 |
| Example 3 | 34.12674 |
| Example 4 | 13.92974 |
| Example 5 | 9.590366 |
| Example 6 | 7.27839 |
| Example 7 | 3.459992 |
| Example 8 | 2.280373 |
| Comparative Example E | 0.900372 |
| Comparative Example F | 1.452025 |
| Comparative Example G | 2.819362 |
| Comparative Example H | 0.820983 |
| Comparative Example I | 0.418785 |
| Example 9 (Peanut Milk) | 19.88 |

Figure 3:
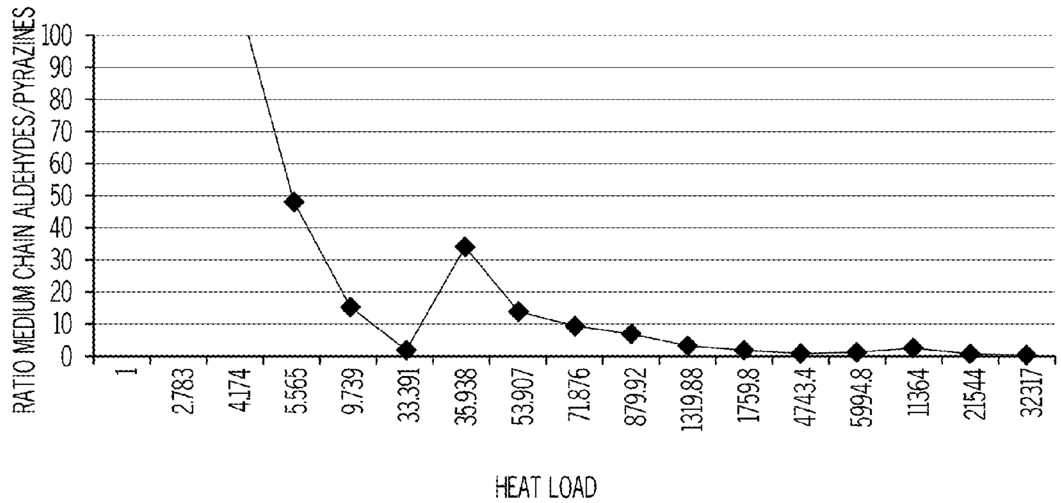
FIG. 3 graphically depicts the ratio of medium chain aldehydes to pyrazines as a function of heat load.
Figure 4:
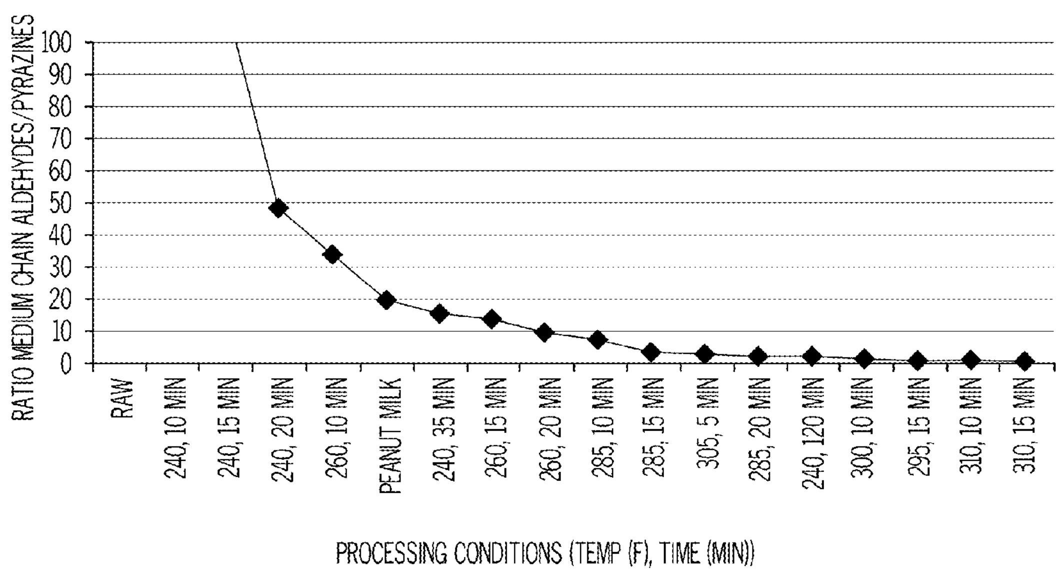
FIG. 4 graphically depicts the ratio of medium chain aldehydes to pyrazines as a function of processing conditions.

Referring now to FIGS. 3 and 4, FIG. 3 graphically depicts the ratio of medium chain aldehydes to pyrazines as a function of heat load and FIG. 4 graphically depicts the ratio of medium chain aldehydes to pyrazines as a function of processing conditions (i.e., time and temperature). As shown in FIG. 3, the ratio of medium chain aldehydes to pyrazines increases exponentially with decreasing heat load and vice-versa. That is, the ratio of medium chain aldehydes to pyrazines decreases exponentially with increasing heat load. FIG. 4 generally shows the same trends with respect to combinations of temperature and time. It is believed that the discontinuity in FIG. 3 is due to the wider range of times tested at a temperature of 240° F. (115.6° C.) (10-120 minutes for 240° F. compared to 10-20 minutes for other temperatures).

Figure 5:
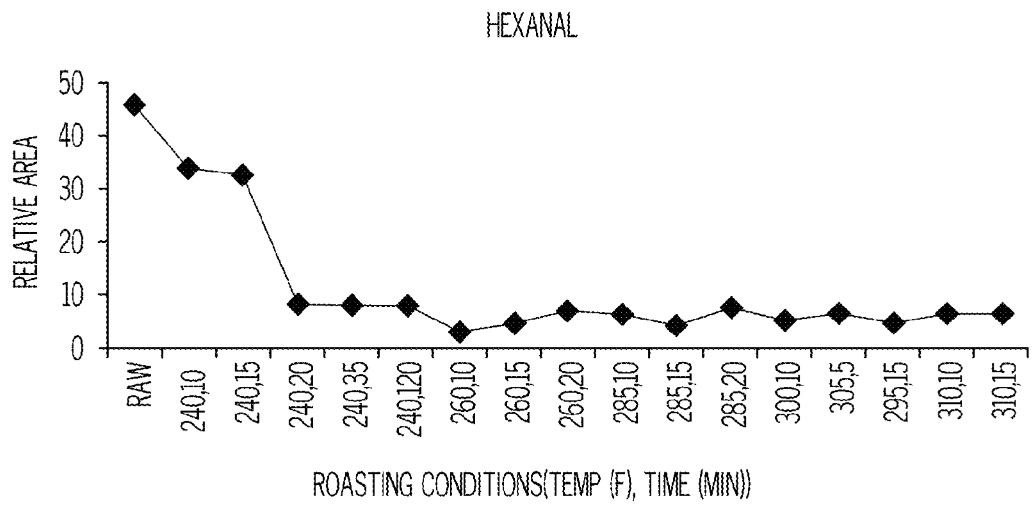
FIG. 5 graphically depicts the relative amount of the medium chain aldehyde hexanal as a function of processing conditions.
Figure 6:
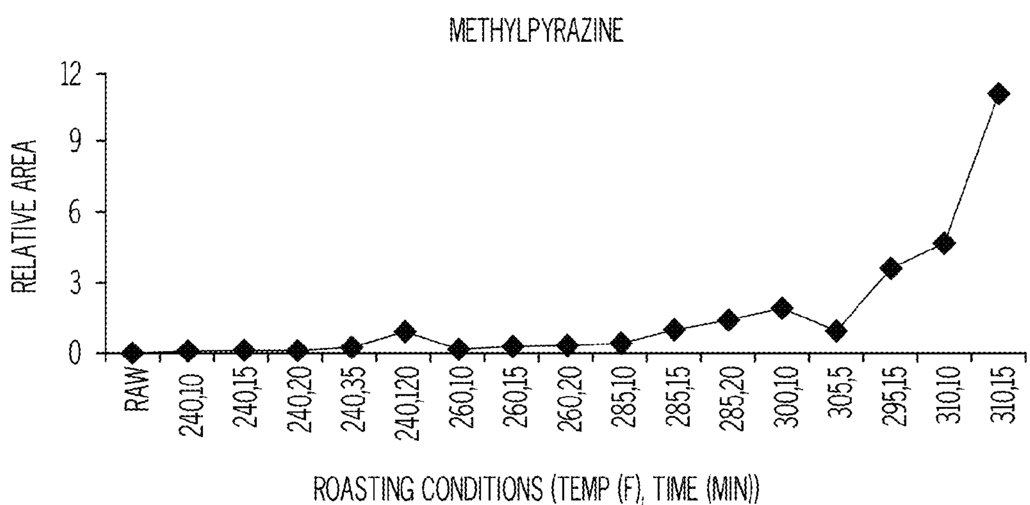
FIG. 6 graphically depicts the relative amount of the pyrazine compound methylpyrazine as a function of processing conditions.
Figure 7:
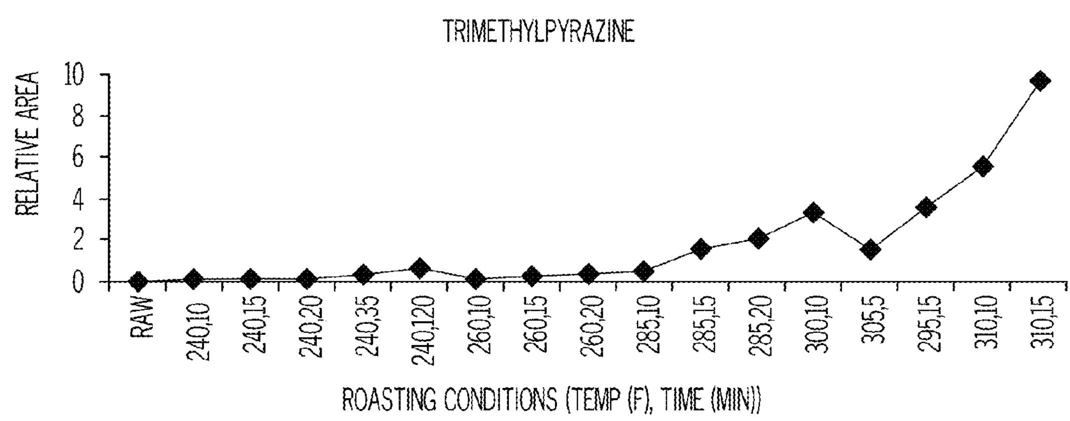
FIG. 7 graphically depicts the relative amount of the pyrazine compound trimethylpyrazine as a function of processing conditions.

It is believed that these trends are due to the evolution of different volatile compounds at different heat loads achieved through different processing conditions. Referring to FIGS. 5-7 by way of example, the relative amounts of the medium chain aldehyde hexanal (FIG. 5), the pyrazine compound methylpyrazine (FIG. 6), and the pyrazine compound trimethylpyrazine (FIG. 7) are graphically depicted as a function of processing conditions. As shown in FIG. 5, it has been found that greater amounts of the medium chain aldehyde hexanal is produced at relatively lower heat loads (i.e., combinations of lower temperatures and/or processing times) which has the result of imparting a strong “grassy” or “beany” flavor to the finished product which may be undesirable. In contrast, it has also been found that the pyrazine compounds, such as methylpyrazine and trimethylpyrazine, are produced at relatively higher heat loads (i.e., combinations of higher temperatures and/or processing times), as shown in FIGS. 6 and 7, which has the result of imparting a strong “roasted” or even “burnt” flavor to the finished product which may be undesirable. Based on this data, it has been found that the roasted/burnt flavors due to pyrazines and the grassy/beany flavors due to medium chain aldehydes can be reduced by controlling the heat load applied to the peanuts during processing, resulting in a finished product with a flavor profile acceptable to consumers.

Example 2

To assess the effect of roasting time and temperature on protein products comprising a mixture of protein particulates from peanuts and water, peanuts were heated under three separate processing conditions: 238° F. (114.4° C.) for 20 minutes corresponding to a heat load of 4.308; 248° F. (120° C.) for 35 minutes corresponding to a heat load of 27.01; and 255° F. (123.9° C.) for 35 minutes corresponding to a heat load of 1759. The protein products heated at 238° F. (114.4° C.) for 20 minutes included 13.90 wt. % peanut paste; 85.10 wt. % water; 0.25 wt. % baking soda; 0.30 wt. % calcium carbonate; 0.40 wt. % cellulose gel, and 0.05 wt. % carageenan. The protein products heated at 248° F. (120° C.) for 35 minutes included 8.68 wt. % peanut paste; 90.37 wt. % water; 0.25 wt. % baking soda; 0.30 wt. % calcium carbonate; and 0.40 wt. % cellulose gel. The protein products heated at 255° F. (123.9° C.) for 35 minutes included 11.81 wt. % peanut paste; 87.19 wt. % water; 0.25 wt. % baking soda; 0.30 wt. % calcium carbonate; 0.40 wt. % cellulose gel, and 0.05 wt. % carageenan. The processed peanuts were then ground to form a peanut paste and approximately 14 grams of peanut paste were combined with approximately 86 mL of water and various additives and homogenized to form a peanut milk product.

Thereafter, 2 samples of each peanut milk product were analyzed by gas chromatography-mass spectrometry to determine the ratio of medium chain aldehydes to pyrazines using the methods described in Example 1. It was determined that the peanuts processed at 238° F. (114.4° C.) for 20 minutes produced a peanut milk product having a ratio of medium chain aldehydes to pyrazines of 38.3 and 43.9, respectively. It was also determined that the peanuts processed at 248° F. (120° C.) for 35 minutes produced a peanut milk product having a ratio of medium chain aldehydes to pyrazines of 5.2 and 5.1, respectively. Finally, it was determined that the peanuts processed at 255° F. (123.9° C.) for 35 minutes produced a peanut milk product having a ratio of medium chain aldehydes to pyrazines of 1.6 and 1.7. This data generally indicates that relatively small increases in the time and temperature can have a significant impact in decreasing the ratio of medium chain aldehydes to pyrazines which, in turn, affects the flavor profile of the resulting peanut milk product.

Example 3

In order to evaluate the effect of different sterilization processes on the aggregation of protein in the peanut milk, four identical samples of peanut milk (Examples S1-S4) were prepared and processed under different sterilization conditions. Each sample of peanut milk included 13.90 wt. % peanut paste; 84.7 wt. % water; 0.3 wt. % baking soda; 0.6 wt. % calcium carbonate; and 0.5 wt. % cellulose gel/cellulose gum. The peanut paste was derived from peanuts initially steamed at 200° F. (93.33° C.) for 4.5 minutes and then heated at 270° F. for 35 minutes. The peanuts were then ground to a paste having an average particles size of approximately 39 microns. Example S1 was not subjected to a sterilization process. Example S2 was subjected to a direct sterilization process with the peanut milk being held at a temperature of 275° F. for 7 seconds (the direct sterilization process will be described in more detail below). Example S3 was subjected to an indirect tube and shell sterilization process, as depicted in FIG. 1, in which the peanut milk was held at a temperature of 275° F. for 7 seconds in the tubular heater. Example S4 was subjected to an indirect scrape surface sterilization process in which the peanut milk was held at a temperature of 275° F. for 7 seconds in the scrape surface heat exchanger.

The direct sterilization process to which Example S2 was subjected included pre-heating the peanut milk in a plate-frame heat exchanger to a temperature of about 185° F. (85° C.) and, thereafter, directly injecting steam into the peanut milk (i.e., co-mingling the heating utility (steam) with the peanut milk) to further heat the peanut milk to 275° F. (135° C.). The peanut milk was held at this temperature for a period of seven seconds. The peanut milk was then passed into a vacuum chamber and subjected to a vacuum of −7 psi to extract the steam condensate from the peanut milk. Thereafter, the peanut milk was homogenized at a temperature of 185° F. (85° C.) at a pressure of 3500 psi. The peanut milk was then cooled in a tubular cooler to a temperature of 45° F. (7.2° C.).

Each of the samples was then analyzed with a light microscope to determine the degree of protein aggregation which occurred in the samples as well as the average aggregate size of the protein aggregates. The average aggregate size of the protein aggregates was determined by placing a peanut milk sample on a microscope slide and a drop of acid fuchsin staining solution (0.1% w/w) was added. The acid fuchsin solution stained the protein in the sample pink such that the protein agglomerates could be visibly distinguished from the balance of the sample. Each slide was observed with an Axiophot Zeiss Upright light microscope equipped with a Leica DFC425C CCD camera. Image-Pro® Plus 7.0 software was used to capture images of each sample at a 10× magnification using the differential image contrast (DIC) optical setting. FIGS. 8-11 are magnified images of each of the samples showing the degree of protein aggregation. The collected images were color segmented based on a histogram and then converted to black and white. The “Diameter” size measurement was selected in the Image-Pro® Plus 7.0 software and “Apply Count/Measure” functions were used to detect all visible bright (i.e., white) objects (i.e., protein agglomerates) in the field and determine the size of each object and the average size of all the objects detected.

Figure 8:
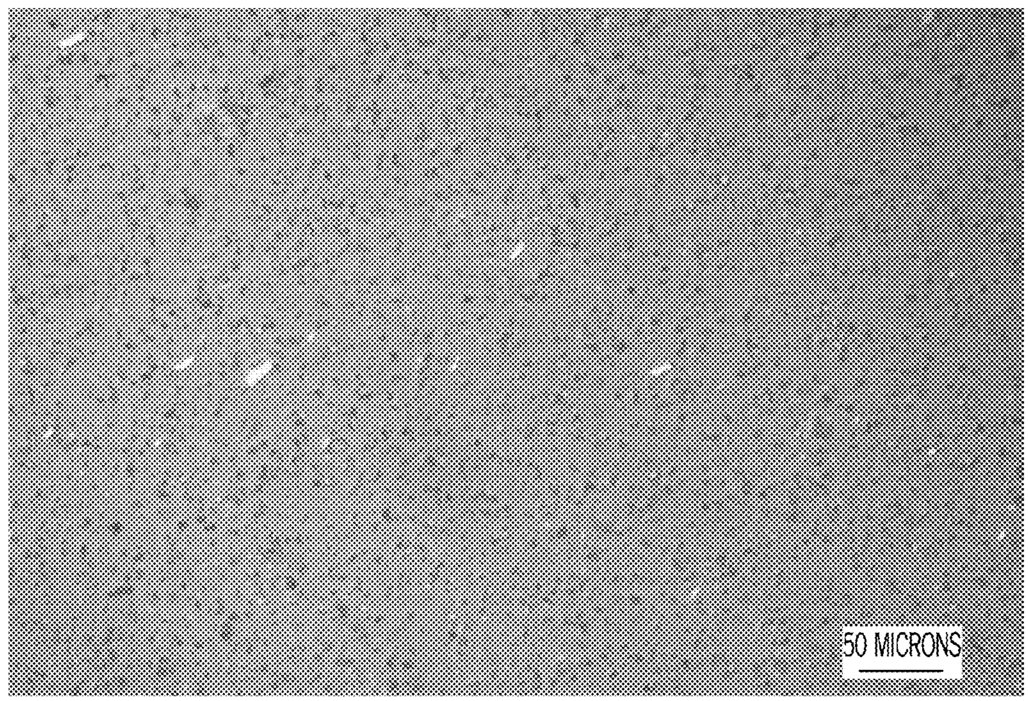
FIG. 8 is a magnified image of a peanut milk sample prior to sterilization showing the degree of protein aggregation in the sample.

More specifically, FIG. 8 is a magnified image of Example S1 which shows that the peanut milk sample, without further processing, was fluid (relatively low viscosity) with well dispersed protein aggregates throughout. Image analysis of Example S1 indicated that the average protein aggregate size in the sample was 1.4 microns. It was also determined that Example S1 had a viscosity of 11.4 centipoise (cP).

Figure 9:
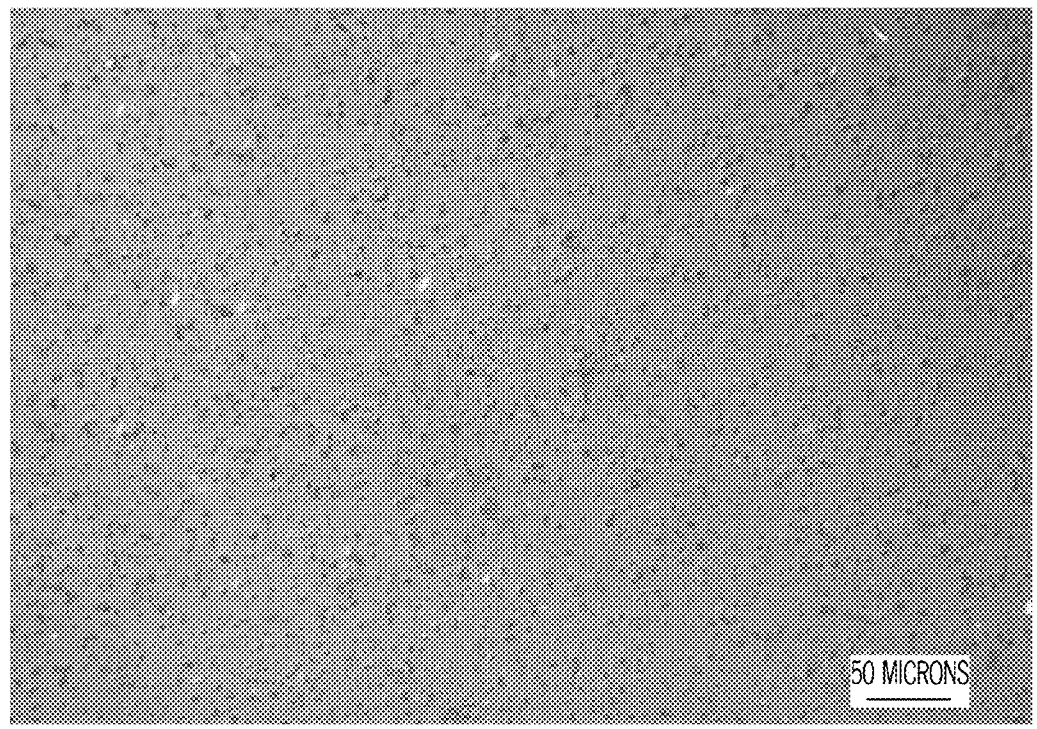
FIG. 9 is a magnified image of a peanut milk sample after exposure to a direct sterilization process showing the degree of protein aggregation in the sample as a result of the direct sterilization process.

FIG. 9 is a magnified image of Example S2 which shows that the peanut milk sample, after exposure to the direct sterilization process, was fluid (relatively low viscosity) with well dispersed protein aggregates throughout. Image analysis of Example S2 indicated that the average protein aggregate size in the sample was 1.6 microns. It was also determined that Example S2 had a viscosity of 14.9 (cP). Accordingly, Example S2 exhibited similar physical properties (protein aggregate size and viscosity) as Example S2 indicating that the direct sterilization process did not cause significant aggregation of the proteins. It was also observed that, after the direct sterilization process, the peanut milk of Example S2 had an obviously different color than Example S1, the color of Example S2 being more yellow than Example S1. While not wishing to be bound by theory, it is believed that this change in color may be a result of the reduction/caramelization of sugar in the peanut milk as a result of the direct sterilization process.

In addition to the average protein aggregate size and the viscosity, samples of the peanut milk of Example S2 were also analyzed to determine the ratio of the total concentration of medium chain aldehydes in the mixture to a total concentration of pyrazines in the mixture after Example S2 was subjected to the direct sterilization process. Specifically, a sample of the peanut milk of Example S2 was analyzed in triplicate using the gas chromatography-mass spectrometry technique of Example 1, described hereinabove. Based on this technique it was determined that the average ratio of the total concentration of medium chain aldehydes to the total concentration of pyrazines of the sample of Example S2 was 0.7.

Figure 10:
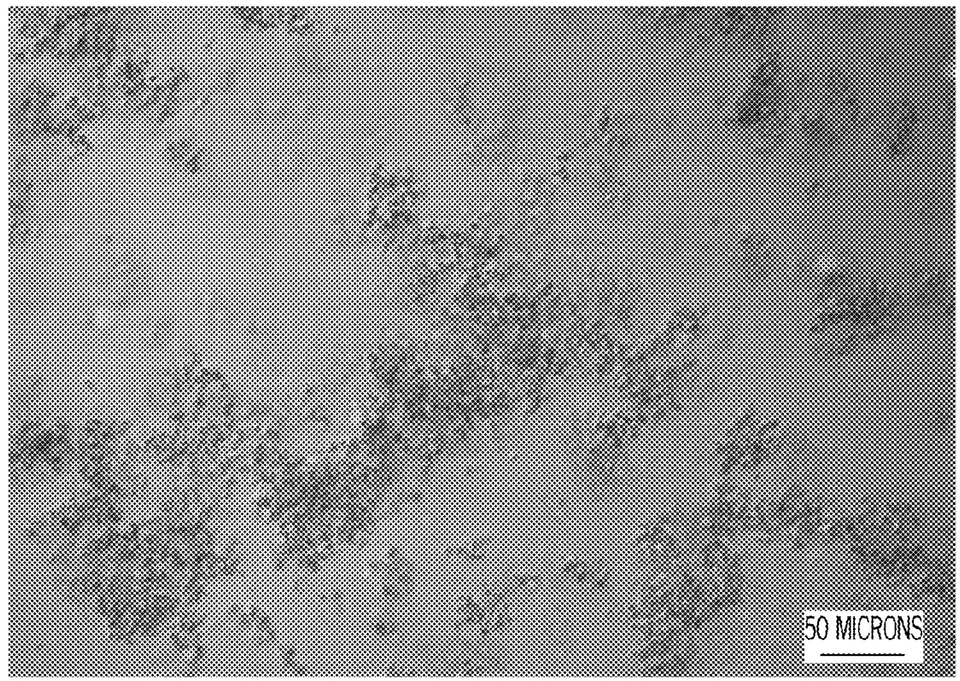
FIG. 10 is a magnified image of a peanut milk sample after exposure to an indirect sterilization process showing the degree of protein aggregation in the sample as a result of the indirect sterilization process.

FIG. 10 is a magnified image of Example S3 which shows that the peanut milk sample, after indirect sterilization, formed a loose, gel-like, non-dense network of relatively large protein aggregates. Image analysis of Example S3 indicated that the average protein aggregate size in the sample was 12 microns. It was also determined that Example S3 had a viscosity of 53.3 cP. It was also observed that, after indirect sterilization, the color of Example S3 did not change significantly from that of Example S1. While not wishing to be bound by theory, it is believed that the lack of a change in color may be a result of less reduced/caramelized sugar in the peanut milk relative to Example S2 which was subjected to the direct sterilization process. Thus, the data derived from Example S3 indicates that different sterilization techniques may yield peanut milk products with different properties.

In addition to the average protein aggregate size and the viscosity, samples of the peanut milk of Example S3 were also analyzed to determine the ratio of the total concentration of medium chain aldehydes in the mixture to a total concentration of pyrazines in the mixture after Example S3 was subjected to the indirect sterilization process. Specifically, a sample of the peanut milk of Example S3 was analyzed in triplicate using the gas chromatography-mass spectrometry technique of Example 1, described hereinabove. Based on this technique it was determined that the average ratio of the total concentration of medium chain aldehydes to the total concentration of pyrazines of the sample of Example S3 was 3.77.

Figure 11:
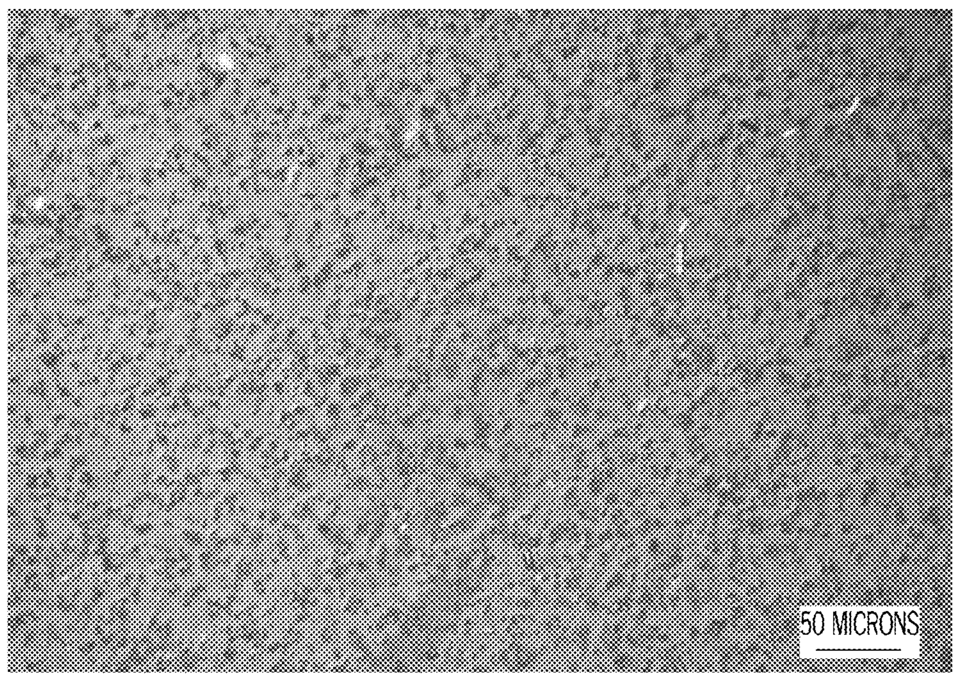
FIG. 11 is a magnified image of a peanut milk sample after exposure to an indirect sterilization process showing the degree of protein aggregation in the sample as a result of the indirect sterilization process.

FIG. 11 is a magnified image of Example S4 which shows that the peanut milk sample, after indirect sterilization, formed a very loose, gel-like, non-dense network of relatively large protein aggregates. Image analysis of Example S4 indicated that the average protein aggregate size in the sample was 6.4 microns. It was also determined that Example S4 had a viscosity of 14.9 cP. It was also observed that, after indirect sterilization, the color of Example S4 did not change significantly from that of Examples S1 and S3. Accordingly, like the data derived from Example S3, the data derived from Example S4 indicates that different sterilization techniques may yield peanut milk products with different properties.

In addition to the average protein aggregate size and the viscosity, samples of the peanut milk of Example S4 were also analyzed to determine the ratio of the total concentration of medium chain aldehydes in the mixture to a total concentration of pyrazines in the mixture after Example S4 was subjected to the indirect sterilization process. Specifically, a sample of the peanut milk of Example S4 was analyzed in triplicate using the gas chromatography-mass spectrometry technique of Example 1, described hereinabove. Based on this technique it was determined that the average ratio of the total concentration of medium chain aldehydes to the total concentration of pyrazines of the sample of Example S4 was 6.29.

Example 4

In this study, 16 samples of protein products were prepared. Each sample started with a mixture of 14% protein paste and 86% water. The protein paste was prepared by heating shelled peanuts at 285° F. for 35 minutes and then grinding the peanuts into a paste. The paste was added to water at 165° F. The mixture was then processed to remove insoluble solids and reduce fat. The resulting mixture was sterilized at 273° F. for 7 seconds. 100 ml aliquots were used for testing. The buffers and/or stabilizers were added to the 100 ml aliquots, mixed with a handblender, and allowed to sit for 20 minutes. Of the samples, 11 samples were made with sodium bicarbonate as the pH buffer and carageenan as the stabilizer. The remaining 5 samples used a mixture of calcium carbonate and sodium bicarbonate as the pH buffer and used carageenan as the stabilizer. The type and amount of pH buffers and stabilizers added to the mixture of protein paste and water is shown in Table 4 below.

TABLE 4

Type and amounts of pH buffer and/or stabilizer.

| Sample | Carageenan (wt. %) | Sodium Bicarbonate (wt. %) | Calcium Carbonate (wt. %) |
|---|---|---|---|
| Example 10 | 0.100 | 0.250 | 0.450 |
| Example 11 | 0.100 | 0.375 | 0.450 |
| Example 12 | 0.100 | 0.500 | 0.450 |
| Comparative Example J | 0.000 | 0.250 | 0.000 |
| Comparative Example K | 0.100 | 0.150 | 0.000 |
| Comparative Example L | 0.100 | 0.250 | 0.000 |
| Comparative Example M | 0.100 | 0.375 | 0.000 |
| Comparative Example N | 0.200 | 0.250 | 0.000 |
| Comparative Example O | 0.000 | 1.000 | 0.000 |
| Comparative Example P | 0.000 | 0.500 | 0.000 |
| Comparative Example Q | 0.050 | 0.250 | 0.000 |
| Comparative Example R | 0.100 | 0.500 | 0.000 |
| Comparative Example S | 0.200 | 0.375 | 0.000 |
| Comparative Example T | 0.200 | 0.375 | 0.000 |
| Comparative Example U | 0.100 | 0.000 | 0.450 |
| Comparative Example V | 0.100 | 0.125 | 0.450 |

Once the pH buffer and stabilizer were added to the protein paste and water mixture to form a buffered protein product, the pH of the protein product was measured using a calibrated pH probe, and the flavor profile of the protein product was measured. Subsequently, 9 mL of the buffered protein product was added to 100 mL of coffee and stirred until the protein product and coffee composition had a uniform color. The coffee was prepared using a drip coffee brewer using one tablespoon of medium roast coffee and 8 ounces of water. 100 ml aliquots of the coffee mixtures were measured and 9 ml of the protein mixture was added. The stability of the protein product and coffee composition was visually inspected for sedimentation over a 15 minute period. A sample with no sedimentation was assigned a "yes" designation; a sample with any sedimentation was assigned a "no" designation. Results of this testing for each sample are shown in Table 5 below.

TABLE 5 pH and flavor profile of buffered protein product and stability of coffee and protein product mixture.

| Sample | pH of Protein Product | Acceptable Flavor Profile | Acceptable Stability |
|---|---|---|---|
| Example 10 | 8.08 | Yes | Yes |
| Example 11 | 8.19 | Yes | Yes |
| Example 12 | 8.31 | Yes | Yes |
| Comparative Example J | 7.88 | Yes | No |
| Comparative Example K | 7.46 | Yes | No |
| Comparative Example L | 7.80 | Yes | No |
| Comparative Example M | 8.02 | Yes | No |
| Comparative Example N | 7.76 | Yes | No |
| Comparative Example O | 8.10 | No | Yes |
| Comparative Example P | 7.94 | No | Yes |
| Comparative Example Q | 7.79 | No | Yes |
| Comparative Example R | 8.18 | No | Yes |
| Comparative Example S | 8.01 | No | Yes |
| Comparative Example T | 8.15 | No | Yes |
| Comparative Example U | 7.52 | Yes | No |
| Comparative Example V | 7.76 | Yes | No |

This data generally indicates that to achieve a protein product with an acceptable flavor profile and acceptable stability when the protein product is added to coffee, a combination of sodium bicarbonate, calcium carbonate, and stabilizer is required.

Based on the foregoing, it should be understood that the protein products described herein comprise a mixture of water and particulate matter comprising protein derived from plants such as, for example and without limitation, tree nuts and/or legumes. The mixture has a relatively high concentration of total protein and, as such, is a suitable substitute for dairy milk. However, unlike dairy milk, the protein product has relatively low cholesterol and is relatively low in calories. Moreover, the protein source is processed to minimize or mitigate the impact of volatile organic aroma compounds on the flavor of the protein product. For example, in embodiments, the ratio of the total concentration of medium chain aldehydes in the water and particulate matter mixture to the total concentration of pyrazines in the water and particulate matter mixture is greater than or equal to 0.5 and less than or equal to 45 to minimize or mitigate off flavors imparted to the protein product by the protein source. In some embodiments, the mixture is sterilized using indirect sterilization processes to yield a sterilized mixture which comprises protein aggregates having an average aggregate size of greater than or equal to 4 microns with a loose, gel-like, non-dense structure which may improve the perceived texture and mouth feel of the mixture. In some embodiments, the protein product comprises buffers that provide stability when the protein product is added to an acidic environment.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

What is claimed is:

1. A protein product comprising:

A mixture of water and particulate matter comprising protein, wherein the particulate matter comprising protein is derived from at least one of tree nuts and peanuts, the mixture comprising:

medium chain aldehydes and pyrazines, wherein a ratio of a total concentration of medium chain aldehydes in the mixture to a total concentration of pyrazines in the mixture as determined by gas chromatograph-mass spectrometry, is greater than or equal to 0.5 and less than or equal to 45;

from about 0.5 wt % to about 8.0 wt % total protein by weight of the mixture;

from about 40 wt % to about 98 wt % water by weight of the mixture; and less than or equal to about 4.0 wt % oil and fat by weight of the mixture, wherein the particulate matter has an average particle size less than or equal to about 50 μm.

2. The protein product of claim 1, wherein the average particle size of the particulate matter comprising protein is less than or equal to about 45 μm.

3. The protein product of claim 1, wherein the ratio of the total concentration of medium chain aldehydes in the mixture to the total concentration of pyrazines in the mixture, as determined by gas chromatography-mass spectrometry, is greater than or equal to 2 and less than or equal to 45.

4. The protein product of claim 1, wherein the ratio of the total concentration of medium chain aldehydes in the mixture to the total concentration of pyrazines in the mixture, as determined by gas chromatography-mass spectrometry, is greater than or equal to 0.75 and less than or equal to 10.

5. The protein product of claim 1, wherein the mixture comprises from about 0.5 wt. % to about 6 wt. % total protein by weight of the mixture.

6. The protein product of claim 1, wherein the mixture comprises from about 70 wt. % to about 85 wt. % water by weight of the mixture.

7. The protein product of claim 1, wherein the mixture comprises greater than or equal to about 0.5 wt. % oil and fat by weight of the mixture.

8. The protein product of claim 1, wherein the mixture has a viscosity greater than or equal to about 15 cP and less than or equal to about 250 cP.

9. A protein product comprising:

a mixture of water and particulate matter comprising protein aggregates derived from peanuts having an average aggregate size of greater than or equal to 4 microns, the mixture comprising:

from about 0.5 wt. % to about 8.0 wt. % total protein by weight of the mixture;

from about 40 wt. % to about 98 wt. % water by weight of the mixture; and less than or equal to about 4.0 wt. % oil and fat by weight of the mixture.

10. The protein product of claim 9, wherein the particulate matter comprising protein aggregates is derived from peanuts processed at a processing temperature greater than or equal to about 238° F. and less than or equal to about 310° F. for a processing time greater than or equal to about 10 minutes and less than or equal to about 120 minutes.

11. The protein product of claim 9, wherein the particulate matter comprising protein aggregates is derived from peanuts comprising medium chain aldehydes and pyrazines, wherein a ratio of a total concentration of medium chain aldehydes in the peanuts as processed to a total concentration of pyrazines in the peanuts as processed, as determined by gas chromatography-mass spectrometry, is greater than or equal to 0.5 and less than or equal to 45.

12. The protein product of claim 9, wherein the particulate matter comprising protein aggregates is derived from peanuts comprising medium chain aldehydes and pyrazines, wherein a ratio of a total concentration of medium chain aldehydes in the peanuts as processed to a total concentration of pyrazines in the peanuts as processed, as determined by gas chromatography-mass spectrometry, is greater than or equal to 0.75 and less than or equal to 10.

13. The protein product of claim 9, wherein the mixture comprises from about 0.5 wt. % to about 6 wt. % total protein by weight of the mixture.

14. The protein product of claim 9, wherein the mixture comprises from about 70 wt. % to about 85 wt. % water by weight of the mixture.

15. The protein product of claim 9, wherein the protein aggregates have an average aggregate size of less than or equal to 144 microns.

16. The protein product of claim 9, wherein the mixture has a viscosity greater than or equal to about 15 cP and less than or equal to about 250 cP.

17. A method of making a protein product, the method comprising:

processing nuts with a heat load greater than or equal to 3, wherein the nuts are at least one of tree nuts and peanuts;

grinding the nuts thereby forming a protein paste;

blending the protein paste with water thereby forming a mixture having a total protein content from about 0.5 wt. % to about 8.0 wt. % by weight of the mixture;

reducing an oil and fat content of the mixture to less than or equal to about 4.0 wt. % by weight of the mixture; and sterilizing the mixture with an indirect sterilization process whereby, after sterilization, the mixture comprises protein aggregates having an average aggregate size greater than or equal to 4 microns.

18. The method of claim 17, wherein, after sterilization, the mixture comprises protein aggregates having an average aggregate size less than or equal to 144 microns.

19. The method of claim 17, wherein the nuts are processed at a processing temperature greater than or equal to about 238° F. and less than or equal to about 310° F. for a processing time greater than or equal to about 10 minutes and less than or equal to about 120 minutes.

20. The method of claim 17, wherein, after processing, the nuts have a moisture content greater than or equal to 1 wt. % and less than or equal to about 4 wt. % by weight of the mixture.

21. The method of claim 17, wherein, after processing, the nuts comprise medium chain aldehydes and pyrazines and a ratio of a total concentration of medium chain aldehydes in the nuts as processed to a total concentration of pyrazines in the nuts as processed, as determined by gas chromatography-mass spectrometry, is greater than or equal to 0.5 and less than or equal to 45.

22. The method of claim 17, wherein, after processing, the nuts comprise medium chain aldehydes and pyrazines and a ratio of a total concentration of medium chain aldehydes in the nuts as processed to a total concentration of pyrazines in the nuts as processed, as determined by gas chromatography-mass spectrometry, is greater than or equal to 0.75 and less than or equal to 10.

23. The method of claim 17, wherein the protein paste comprises particulate matter comprising protein with an average particle size less than or equal to about 50 μm.

24. The method of claim 17, wherein the protein paste is blended with water in a ratio from about 1:5 to about 1:7.

25. The method of claim 17, further comprising filtering the mixture, wherein, after filtering, the mixture comprises particulate matter comprising protein with an average particle size less than or equal to about 50 μm.

26. The method of claim 17, wherein, after reducing, an oil and fat content of the mixture is greater than about 0.5 wt. % by weight of the mixture.

27. The method of claim 17, wherein the oil and fat content of the mixture is reduced by heating the mixture in a separator at a temperature from about 50° C. to about 90° C.

28. The method of claim 17, wherein, after homogenizing, the mixture comprises medium chain aldehydes and pyrazines and a ratio of a total concentration of medium chain aldehydes in the mixture to a total concentration of pyrazines in the mixture, as determined by gas chromatography-mass spectrometry, is greater than or equal to 0.75 and less than or equal to 10.

29. The method of claim 17, further comprising homogenizing the mixture under pressure at elevated temperatures.

* * * * *